(12) United States Patent
Hirao et al.

(10) Patent No.: US 10,794,430 B2
(45) Date of Patent: Oct. 6, 2020

(54) TORQUE TRANSMISSION APPARATUS AND A COLLAR HAVING CONCAVE TOOTH SIDE SURFACES

(71) Applicant: ArvinMeritor Technology, LLC, Troy, MI (US)

(72) Inventors: Wagner Yukio Hirao, Rochester Hills, MI (US); Dhanapal Vittala Raya, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 246 days.

(21) Appl. No.: 16/000,221

(22) Filed: Jun. 5, 2018

(65) Prior Publication Data
US 2019/0366838 A1 Dec. 5, 2019

(51) Int. Cl.
| | |
|---|---|
| *F16D 11/00* | (2006.01) |
| *F16D 11/14* | (2006.01) |
| *F16D 11/10* | (2006.01) |
| *F16D 21/02* | (2006.01) |
| *F16D 1/10* | (2006.01) |
| *B60K 17/04* | (2006.01) |
| *F16C 3/02* | (2006.01) |
| *F16H 48/10* | (2012.01) |
| *F16H 48/24* | (2006.01) |

(52) U.S. Cl.
CPC .......... *F16D 11/00* (2013.01); *B60K 17/046* (2013.01); *F16C 3/02* (2013.01); *F16D 11/10* (2013.01); *F16D 11/14* (2013.01); *F16D 21/02* (2013.01); *F16H 48/10* (2013.01); *F16H 48/24* (2013.01); *F16D 2001/103* (2013.01); *F16D 2011/004* (2013.01); *F16D 2011/008* (2013.01)

(58) Field of Classification Search
CPC ......... F16D 2001/103; F16D 2011/004; F16D 2011/008; F16D 11/10; F16D 11/14; F16D 2023/0631; F16D 2023/0662; F16D 11/00; F16D 21/02
USPC ............................................. 192/69.91, 108
See application file for complete search history.

(56) References Cited

U.S. PATENT DOCUMENTS

| | | | |
|---|---|---|---|
| 2,338,154 A | | 1/1944 | Wilkinson |
| 2,450,896 A | * | 10/1948 | Kimberly, Jr. .......... F16D 11/10 192/69.91 |
| 3,249,188 A | | 5/1966 | Maina |
| 3,367,462 A | * | 2/1968 | Bibbens .................. F16D 11/10 192/55.2 |

(Continued)

FOREIGN PATENT DOCUMENTS

| | | |
|---|---|---|
| DE | 2005047 A1 | 8/1971 |
| DE | 3036465 A1 | 5/1982 |

(Continued)

OTHER PUBLICATIONS

European Patent Office, Extended European Search Report for European Application No. 19177065.0-1012, dated Aug. 9, 2019.

*Primary Examiner* — Richard M Lorence
(74) *Attorney, Agent, or Firm* — Brooks Kushman PC

(57) ABSTRACT

A collar and a torque transmission apparatus having a collar. The collar may have a set of collar teeth. Each collar tooth may include a first end surface, a second end surface, a first collar side surface, and a second collar side surface. The first and second collar side surfaces may be concave from the first end surface to the second end surface.

20 Claims, 23 Drawing Sheets

(56) References Cited

U.S. PATENT DOCUMENTS

| | | | | |
|---|---|---|---|---|
| 5,076,111 | A | * 12/1991 | Love | B60K 17/08 |
| | | | | 74/331 |
| 5,603,671 | A | 2/1997 | Schmidt | |
| 7,530,912 | B2 | 5/2009 | Kramer | |
| 8,858,379 | B2 | 10/2014 | Keeney et al. | |
| 9,719,563 | B2 | 8/2017 | Hirao | |
| 10,500,941 | B2 * | 12/2019 | Garcia | B60K 17/165 |
| 2003/0125150 | A1 * | 7/2003 | Tanzer | F16H 3/54 |
| | | | | 475/150 |
| 2014/0190781 | A1 | 7/2014 | Lawson et al. | |

FOREIGN PATENT DOCUMENTS

| | | |
|---|---|---|
| DE | 4120262 A1 | 5/1992 |
| DE | 19827756 A1 | 12/1999 |
| DE | 19915926 A1 | 3/2000 |
| DE | 19952625 A1 | 6/2001 |
| DE | 10226572 A1 | 1/2004 |
| DE | 102004038882 A1 | 3/2005 |
| EP | 0677414 A2 | 10/1995 |
| JP | S57059124 U1 | 9/1955 |
| JP | H04185207 A | 2/1992 |
| JP | 2002364733 A | 12/2002 |
| JP | 2003019911 A | 1/2003 |
| JP | 2006231385 A | 9/2006 |

\* cited by examiner

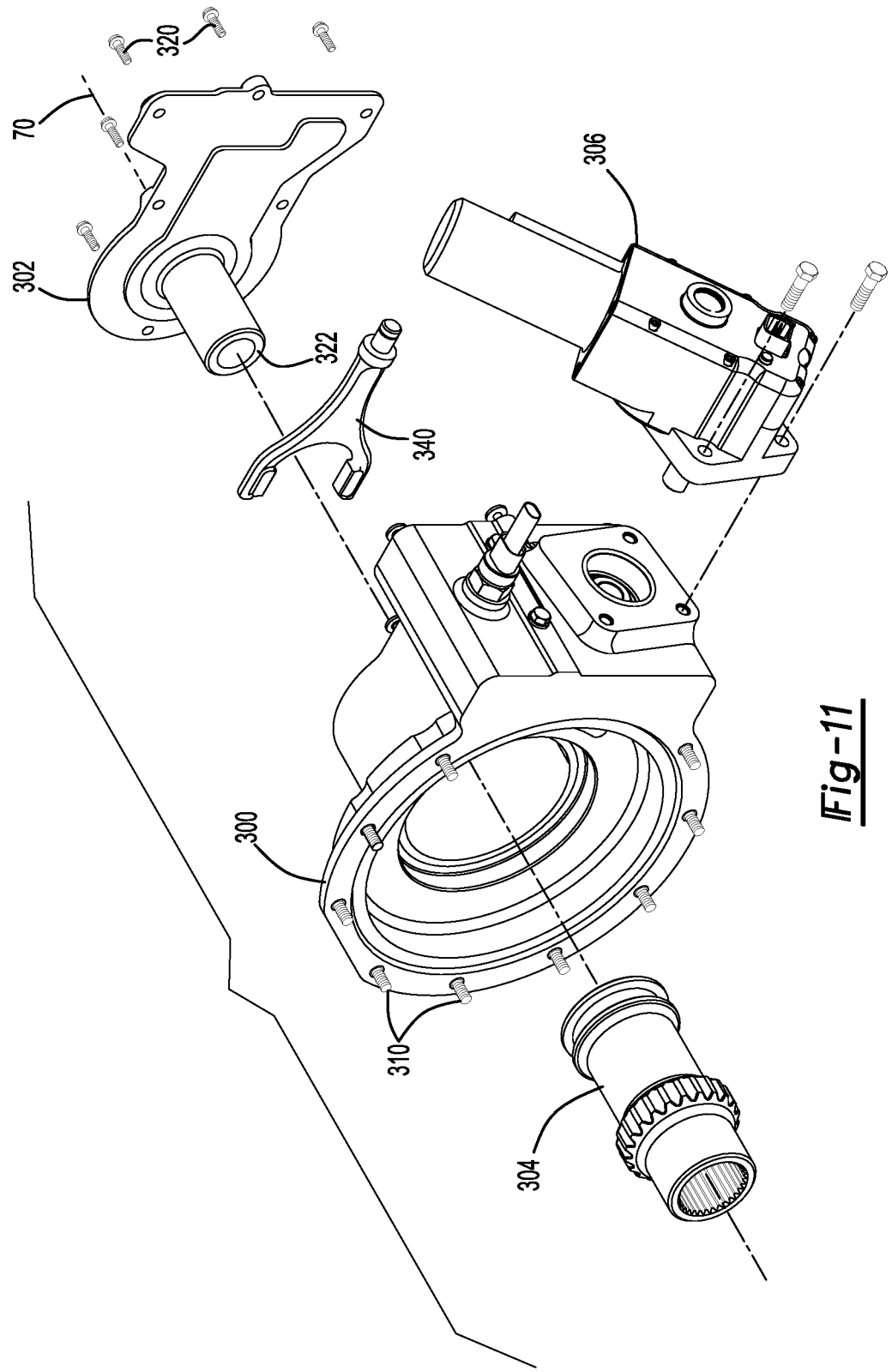

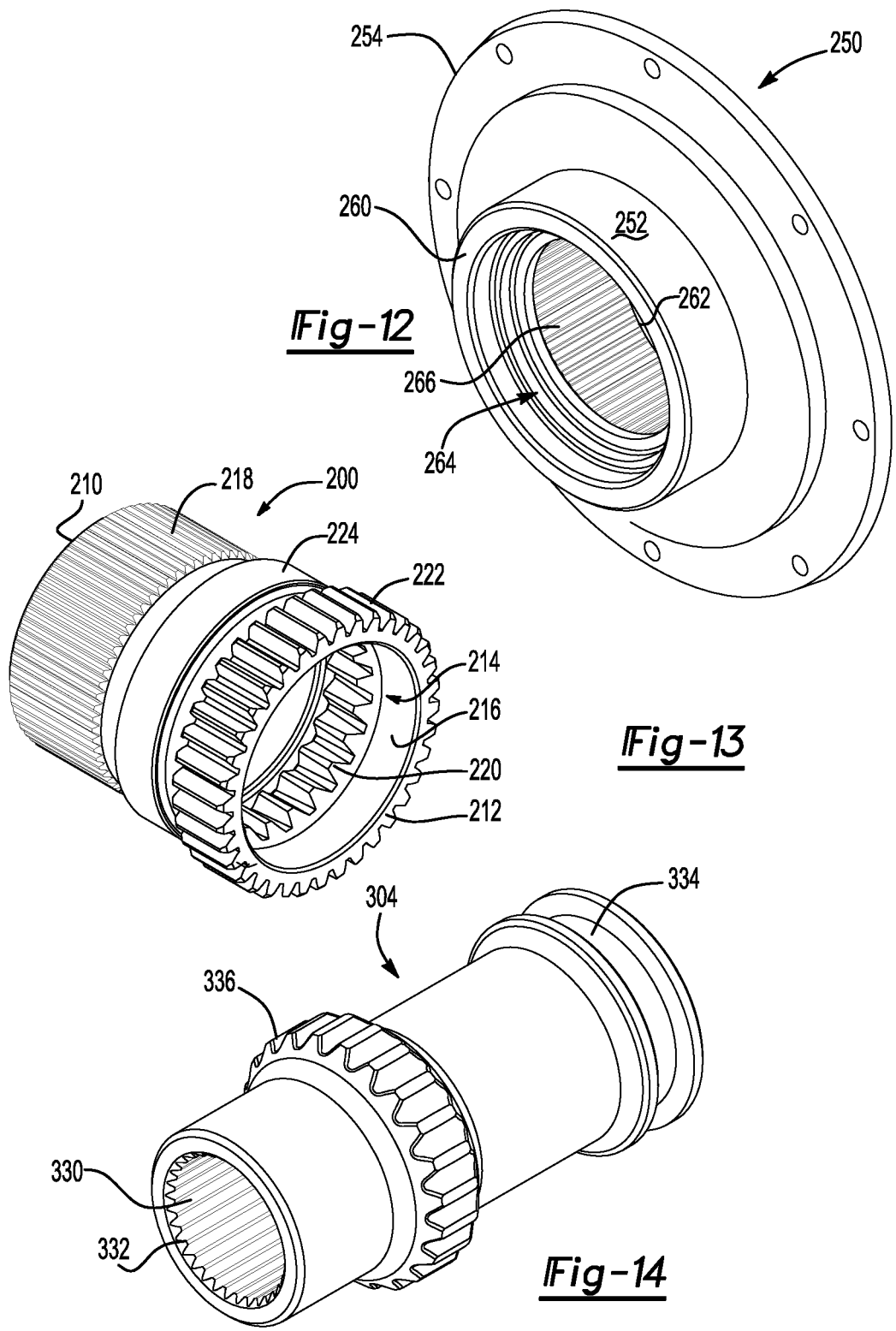

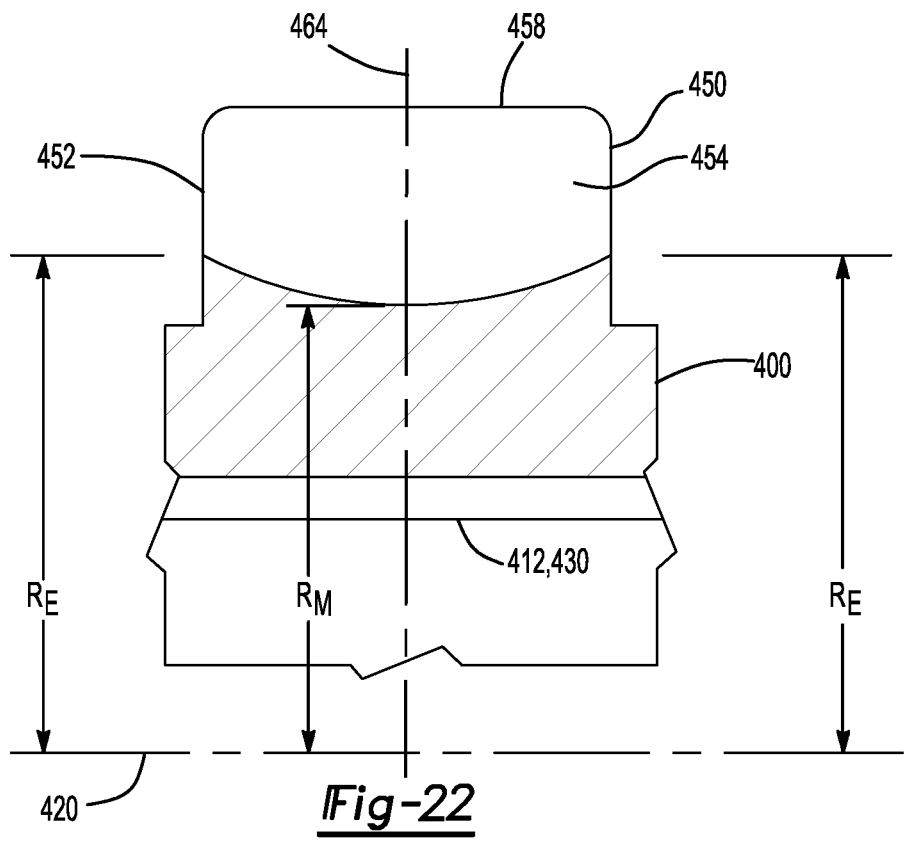
Fig-22
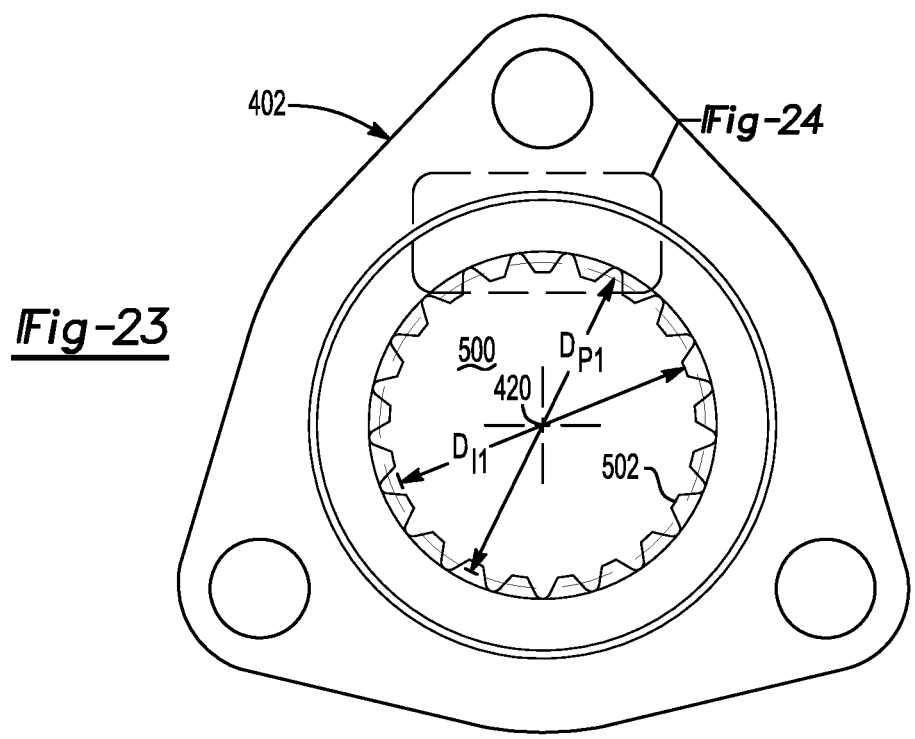
Fig-23
Fig-24

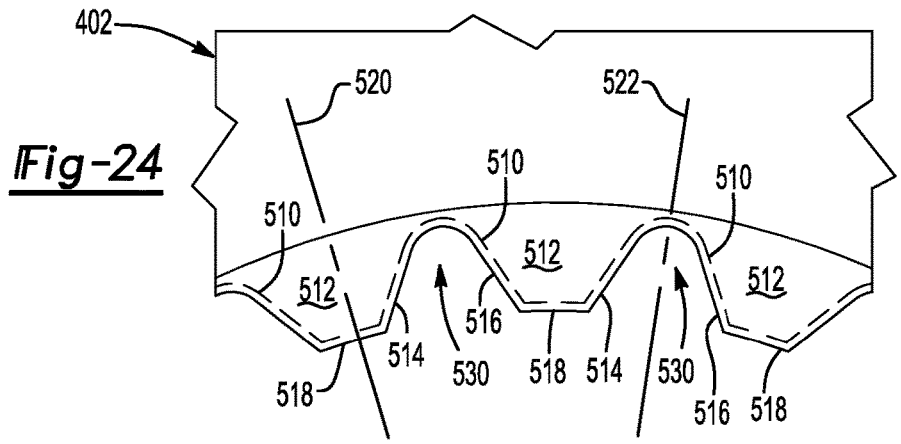
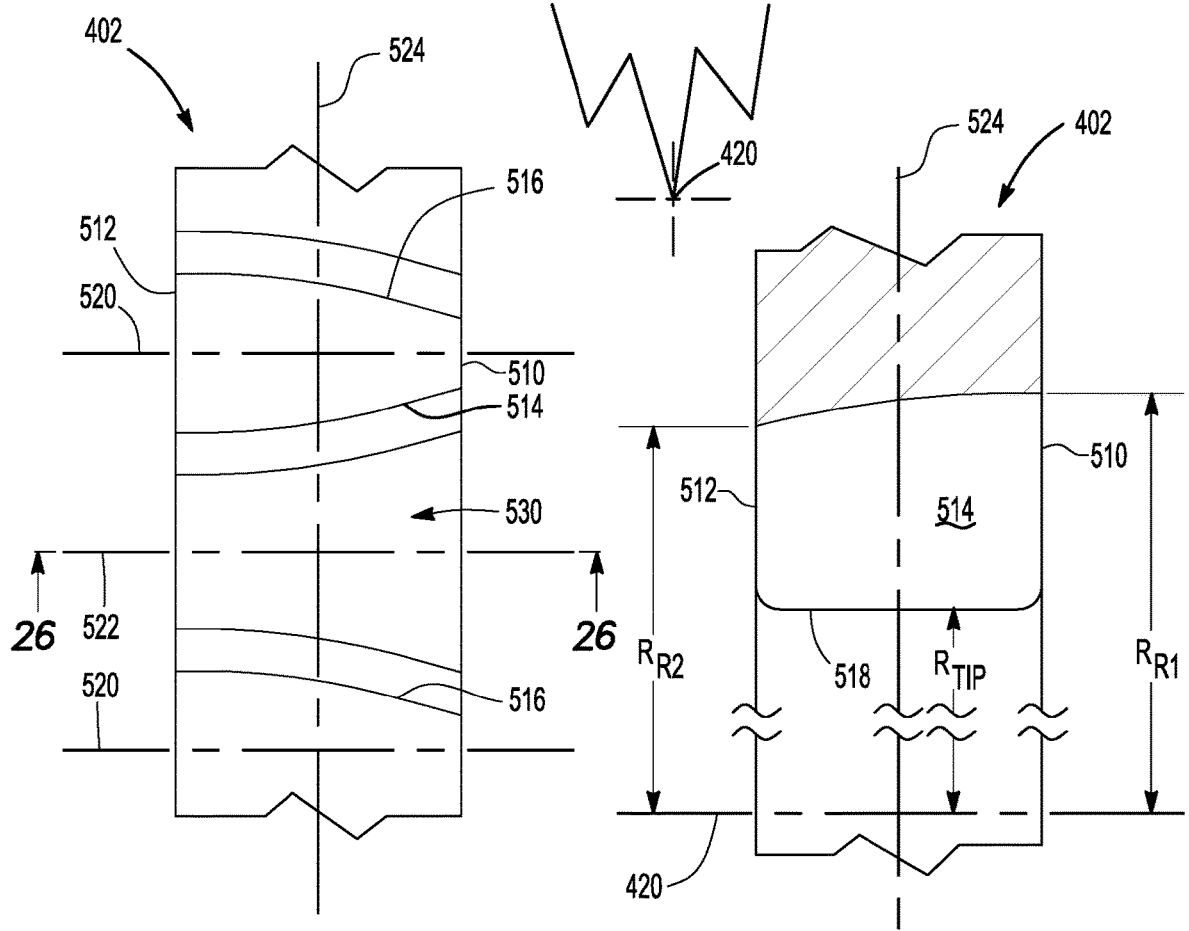
Fig-24
Fig-25
Fig-26

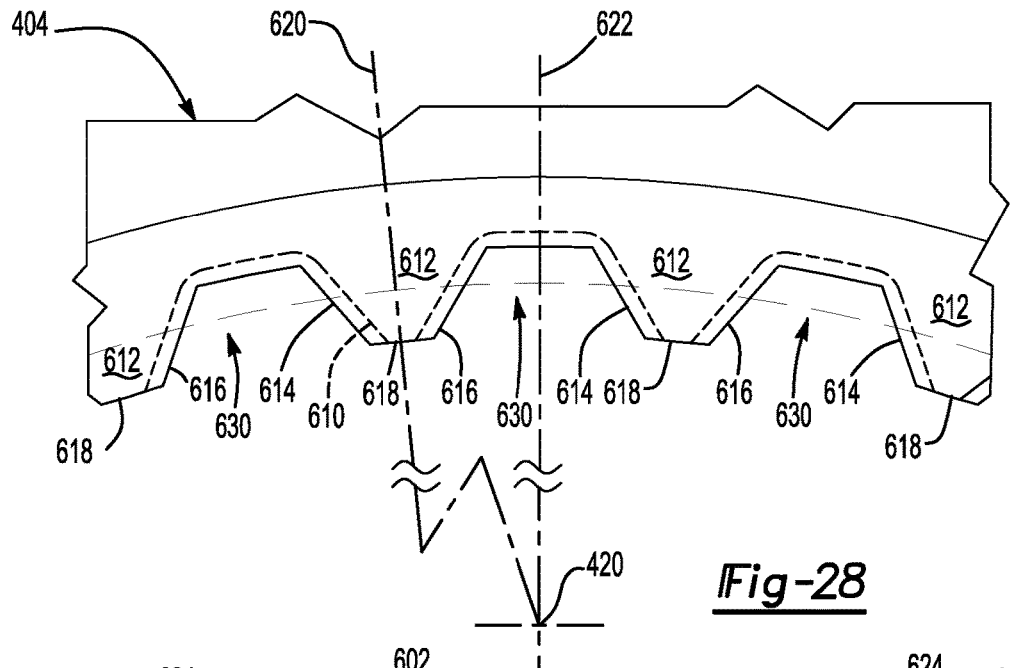
Fig-28
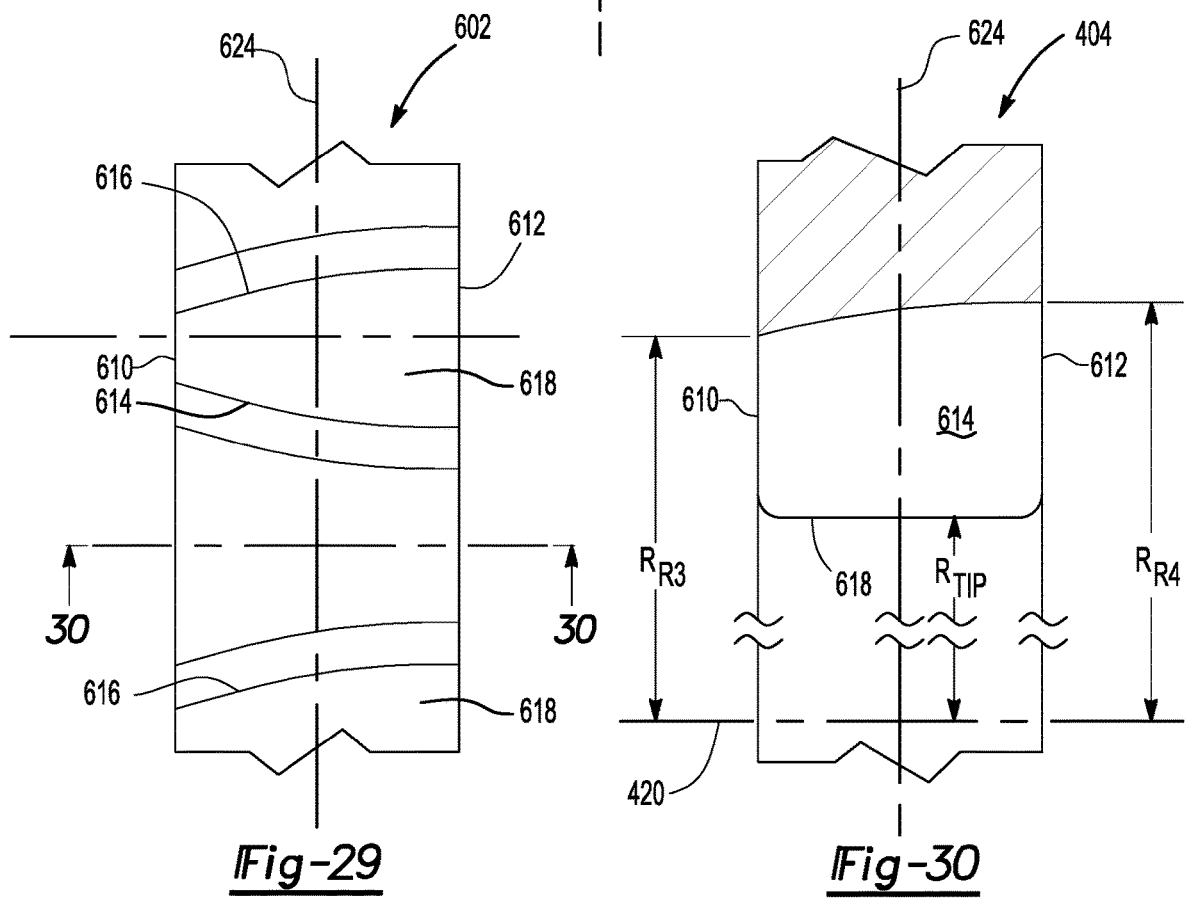
Fig-29
Fig-30

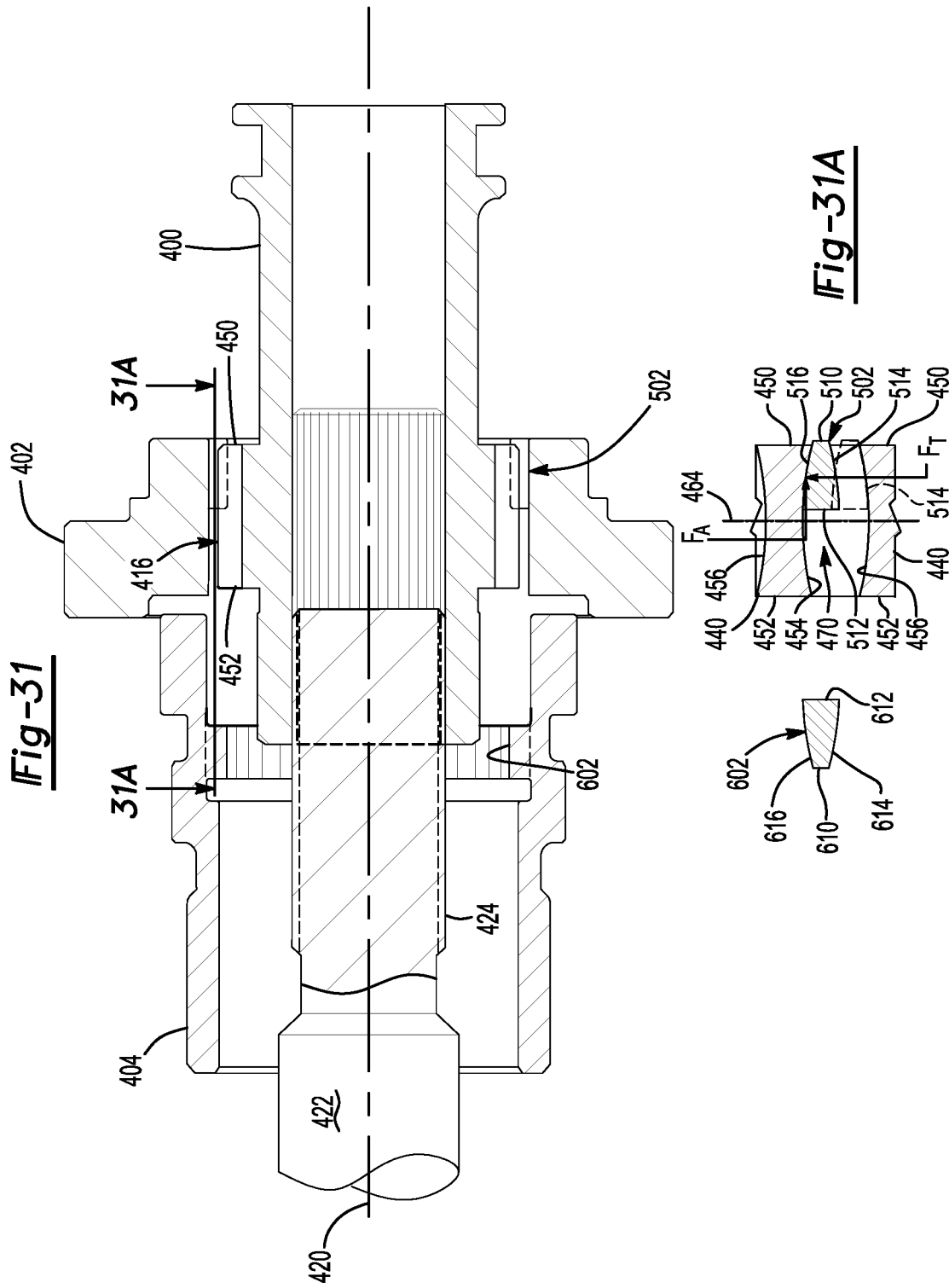

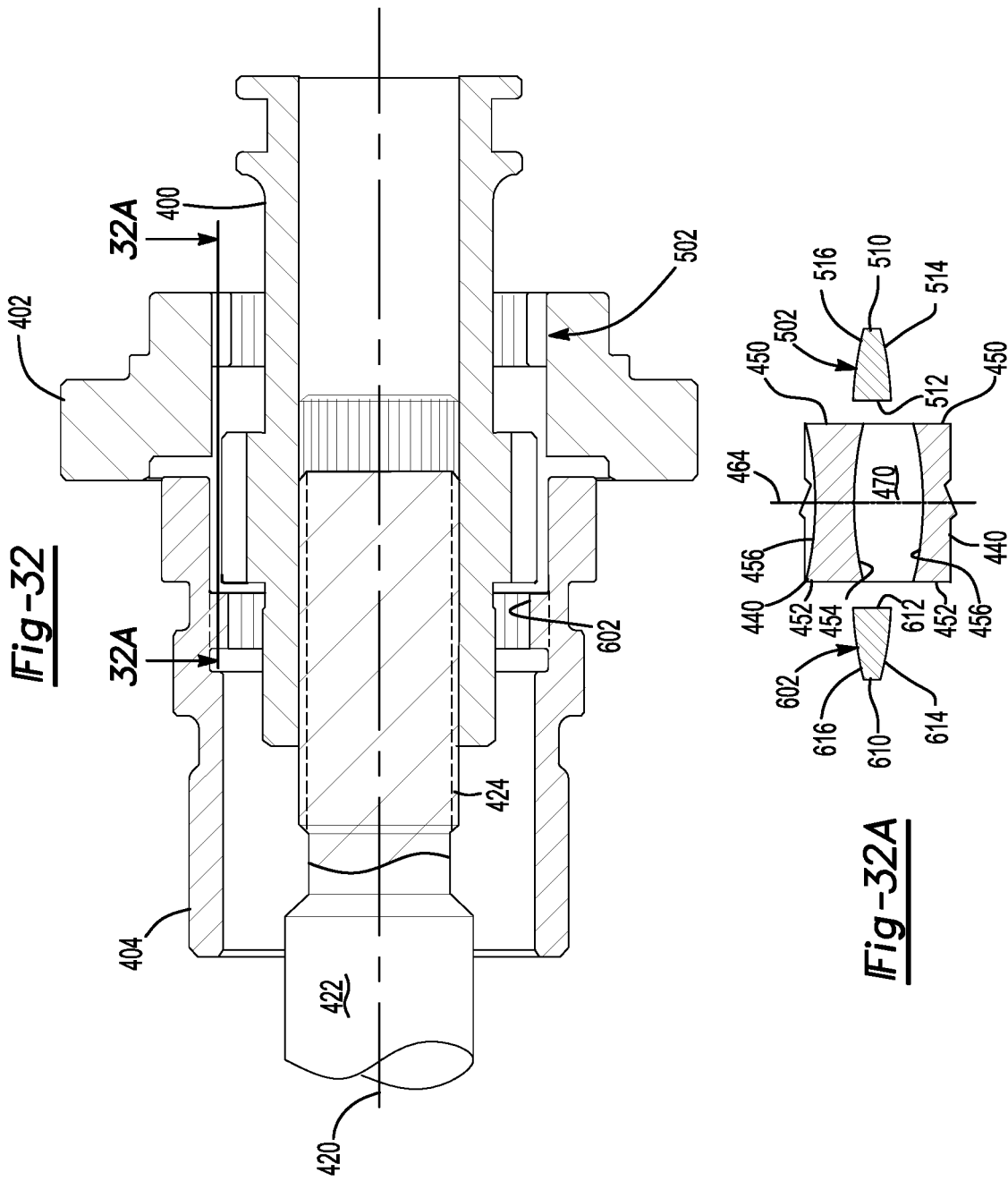

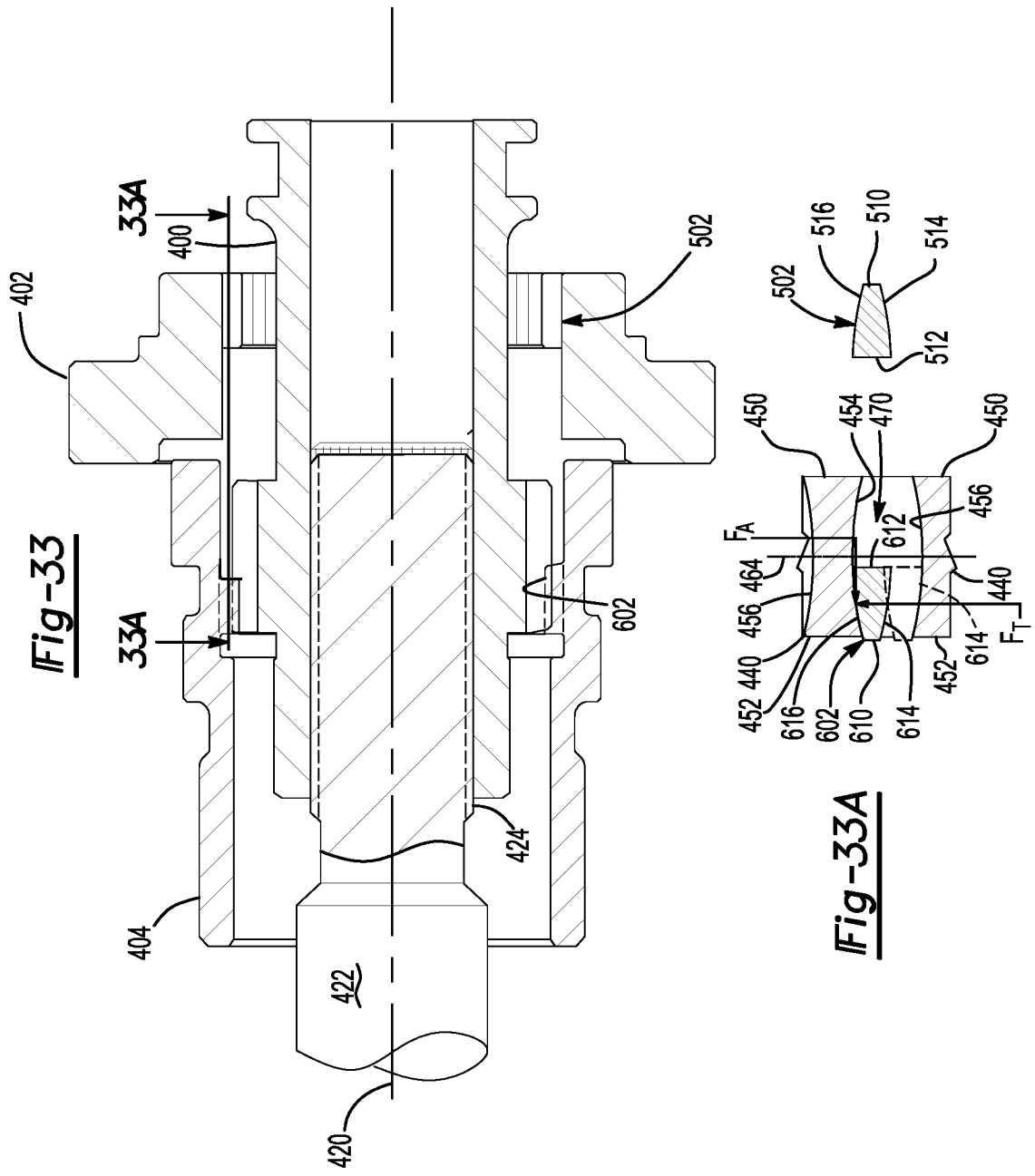

TORQUE TRANSMISSION APPARATUS AND A COLLAR HAVING CONCAVE TOOTH SIDE SURFACES

TECHNICAL FIELD

This disclosure relates to a torque transmission apparatus and a collar that has teeth that have concave side surfaces.

BACKGROUND

An axle assembly having a clutch collar and a tapered spline arrangement is disclosed in U.S. Pat. No. 9,719,563.

SUMMARY

In at least one embodiment a collar is provided. The collar may have a set of collar teeth. The set of collar teeth may be disposed opposite a collar hole that may extend along an axis. Each collar tooth may include a first end surface, a second end surface, a first collar side surface, and a second collar side surface. The first and second end surfaces may extend away from the axis. The second end surface may be disposed opposite the first end surface. The first and second collar side surfaces may be concave from the first end surface to the second end surface. The second collar side surface may be disposed opposite the first collar side surface.

In at least one embodiment, a torque transmission apparatus is provided. The axle assembly may include a shaft, a collar, and a first drive component. The shaft may extend along an axis and may have a shaft spline. The collar may include a collar hole, a collar spline, and a set of collar teeth. The collar hole may be disposed along the axis and may receive the shaft. The collar spline may be disposed in the collar hole and may mate with the shaft spline. The set of collar teeth may be disposed opposite the collar hole. The collar teeth may include a first end surface, a second end surface, a first collar side surface, and a second collar side surface. The first and second end surfaces may extend away from the axis. The second end surface may be disposed opposite the first end surface. The first and second collar side surfaces may be concave from the first end surface to the second end surface. The second collar side surface may be disposed opposite the first collar side surface. The first drive component may be selectively engageable with the collar. The first drive component may include a first opening and a first set of teeth. The first opening may receive the collar. The first set of teeth may be disposed in the first opening and may be selectively engageable with the set of collar teeth. Each tooth of the first set of teeth may include a first end, a second end, a first side surface, and a second side surface. The first end may be disposed opposite the second end. The first and second side surface may be convex between the first end to the second end. The second side surface may be disposed opposite the first side surface. The first side surface may engage the first collar side surface or the second side surface may engage the second collar side surface when the first set of teeth meshes with the collar teeth.

BRIEF DESCRIPTION OF THE DRAWINGS

FIGS. 5-11 are exploded views of the axle assembly.

FIG. 12 is a perspective view of an adapter that may be provided with the axle assembly.

FIG. 13 is a perspective view of a sun gear that may be provided with the axle assembly.

FIG. 14 is a perspective view of a collar that may be provided with the axle assembly.

FIG. 22 is a section view along section line 22-22.

FIG. 23 is a side view of a first drive component.

FIG. 24 is a magnified view of a portion of FIG. 23.

FIG. 25 is a plan view of internal teeth of the first drive component.

FIG. 26 is a section view along section line 26-26.

FIG. 28 is a magnified view of a portion of FIG. 27.

FIG. 29 is a plan view of internal teeth of the second drive component.

FIG. 30 is a section view along section line 30-30.

FIG. 31 is a section view showing a collar in a first position.

FIG. 31A is a section view along section line 31A-31A.

FIG. 32 is a section view showing a collar in a first position.

FIG. 32A is a section view along section line 32A-32A.

FIG. 33 is a section view showing a collar in a first position.

FIG. 33A is a section view along section line 33A-33A.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
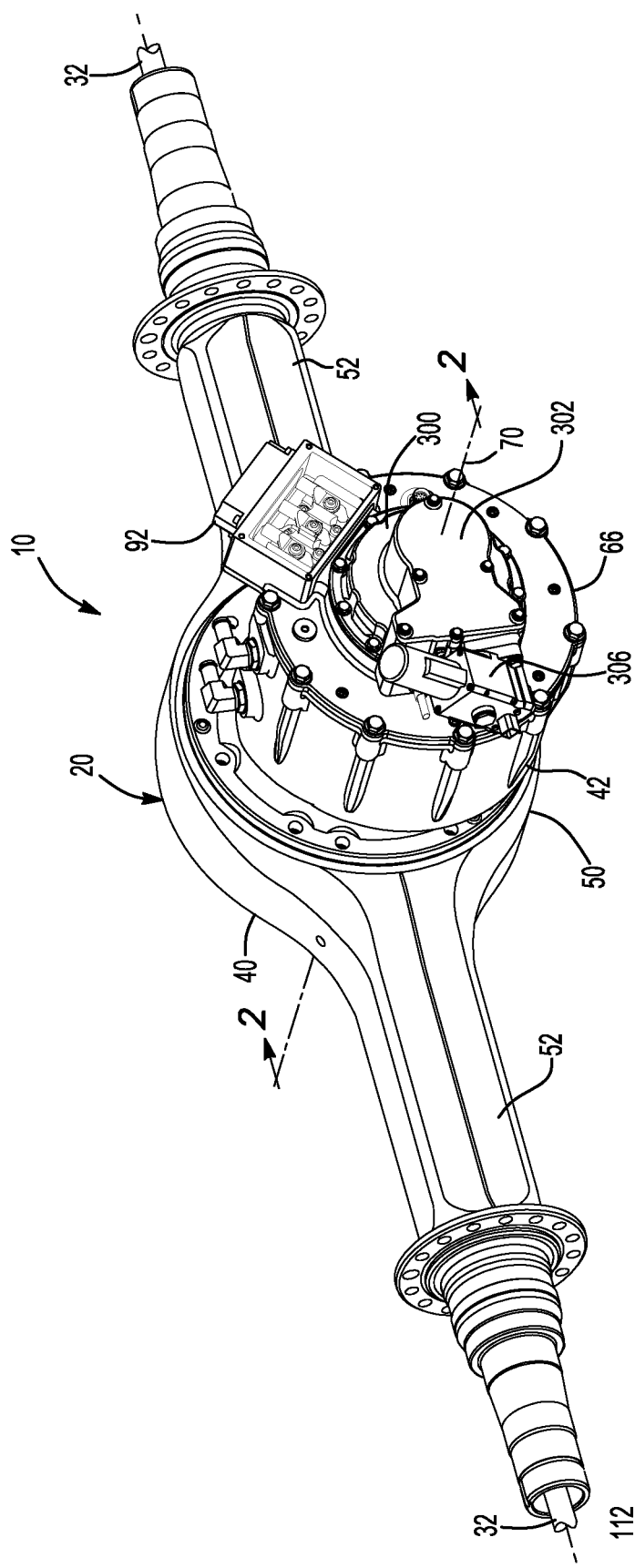
FIG. 1 is a perspective view of an axle assembly.

Referring to FIG. 1, an example of an axle assembly 10 is shown. The axle assembly 10 may be provided with a motor vehicle like a truck, bus, farm equipment, mining equipment, military transport or weaponry vehicle, or cargo loading equipment for land, air, or marine vessels. The motor vehicle may include a trailer for transporting cargo in one or more embodiments.

The axle assembly 10 may provide torque to one or more traction wheel assemblies that may include a tire mounted on a wheel. One or more axle assemblies may be provided with the vehicle. As is best shown with reference to FIGS. 1 and 2, the axle assembly 10 may include a housing assembly 20, a drive pinion 22, an electric motor module 24, a gear reduction module 26, a shift mechanism 28, a differential assembly 30, and at least one axle shaft 32.

Referring to FIG. 1, the housing assembly 20 may receive various components of the axle assembly 10. In addition, the housing assembly 20 may facilitate mounting of the axle assembly 10 to the vehicle. In at least one configuration, the housing assembly 20 may include an axle housing 40 and a differential carrier 42.

The axle housing 40 may receive and support the axle shafts 32. In at least one embodiment, the axle housing 40 may include a center portion 50 and at least one arm portion 52.

Figure 2:
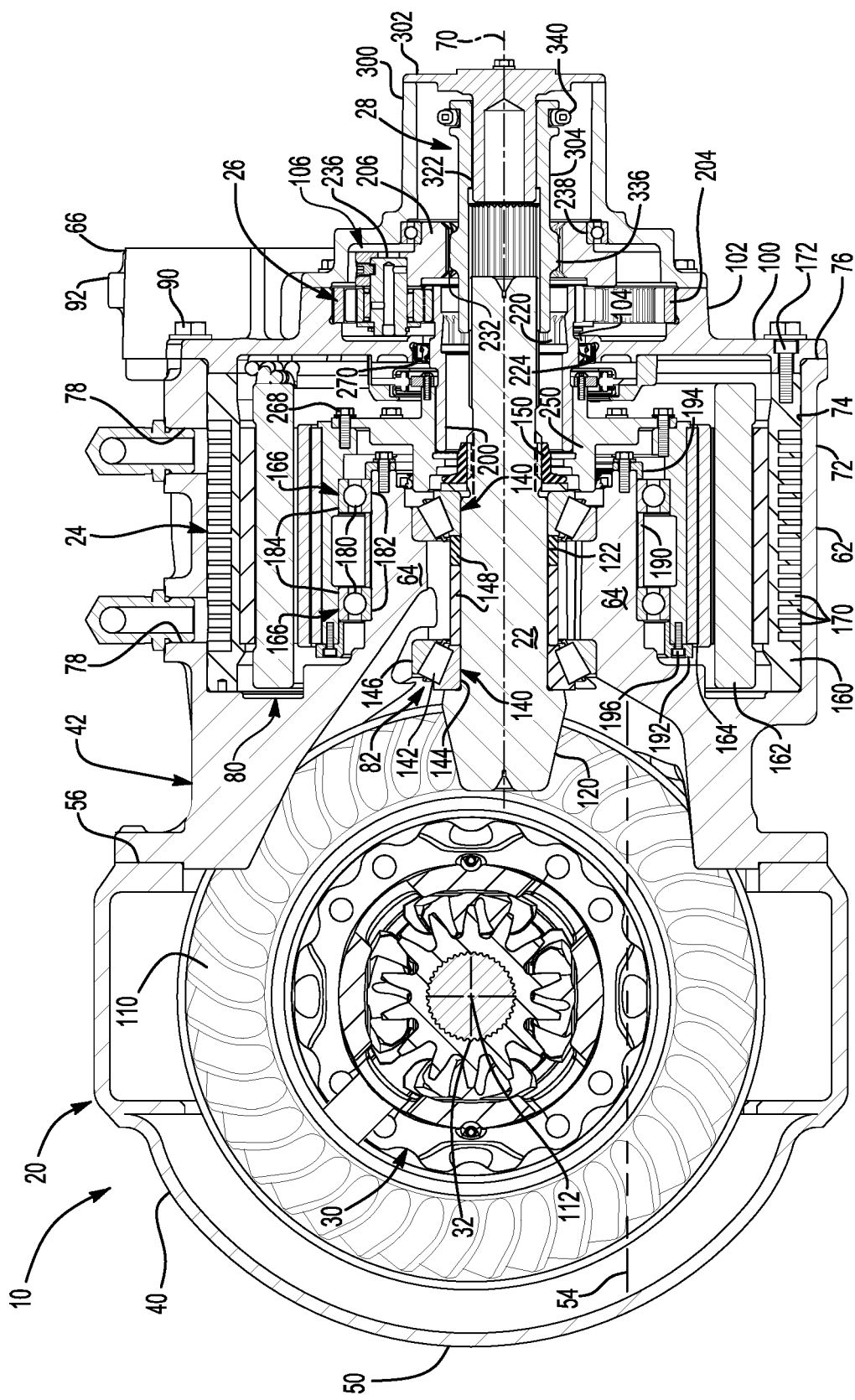
FIG. 2 is a section view of the axle assembly along section line 2-2 showing a collar in a first position.

The center portion 50 may be disposed proximate the center of the axle housing 40. The center portion 50 may define a cavity that may receive the differential assembly 30. As is best shown in FIG. 2, a lower region of the center portion 50 may at least partially define a sump portion that may contain lubricant 54. Splashed lubricant 54 may flow down the sides of the center portion 50 and may flow over internal components of the axle assembly 10 and gather in the sump portion.

The center portion 50 may include a carrier mounting surface 56. The carrier mounting surface 56 may face toward and may engage the differential carrier 42. The carrier mounting surface 56 may facilitate mounting of the differential carrier 42 to the axle housing 40. For example, the carrier mounting surface 56 may have a set of holes that may be aligned with corresponding holes on the differential carrier 42. Each hole may receive a fastener, such as a bolt, that may couple the differential carrier 42 to the axle housing 40.

Referring to FIG. 1, one or more arm portions 52 may extend from the center portion 50. For example, two arm portions 52 may extend in opposite directions from the center portion 50 and away from the differential assembly 30. The arm portions 52 may have substantially similar configurations. For example, the arm portions 52 may each have a hollow configuration or tubular configuration that may extend around the corresponding axle shaft 32 and may help separate or isolate the axle shaft 32 from the surrounding environment. An arm portion 52 or a portion thereof may be integrally formed with the center portion 50. Alternatively, an arm portion 52 may be separate from the center portion 50. In such a configuration, each arm portion 52 may be attached to the center portion 50 in any suitable manner, such as by welding or with one or more fasteners. Each arm portion 52 may define an arm cavity that may receive a corresponding axle shaft 32. It is also contemplated that the arm portions 52 may be omitted.

Referring to FIGS. 1 and 2, the differential carrier 42, which may also be called a carrier housing, may be mounted to the center portion 50 of the axle housing 40. The differential carrier 42 may receive the electric motor module 24 and may support the differential assembly 30. As is best shown with reference to FIGS. 2 and 5, the differential carrier 42 may include one or more bearing supports 60, an exterior wall 62, and a bearing support wall 64. In addition, a differential carrier cover 66 may be disposed on the differential carrier 42 as is best shown with reference to FIG. 2.

Figure 5:
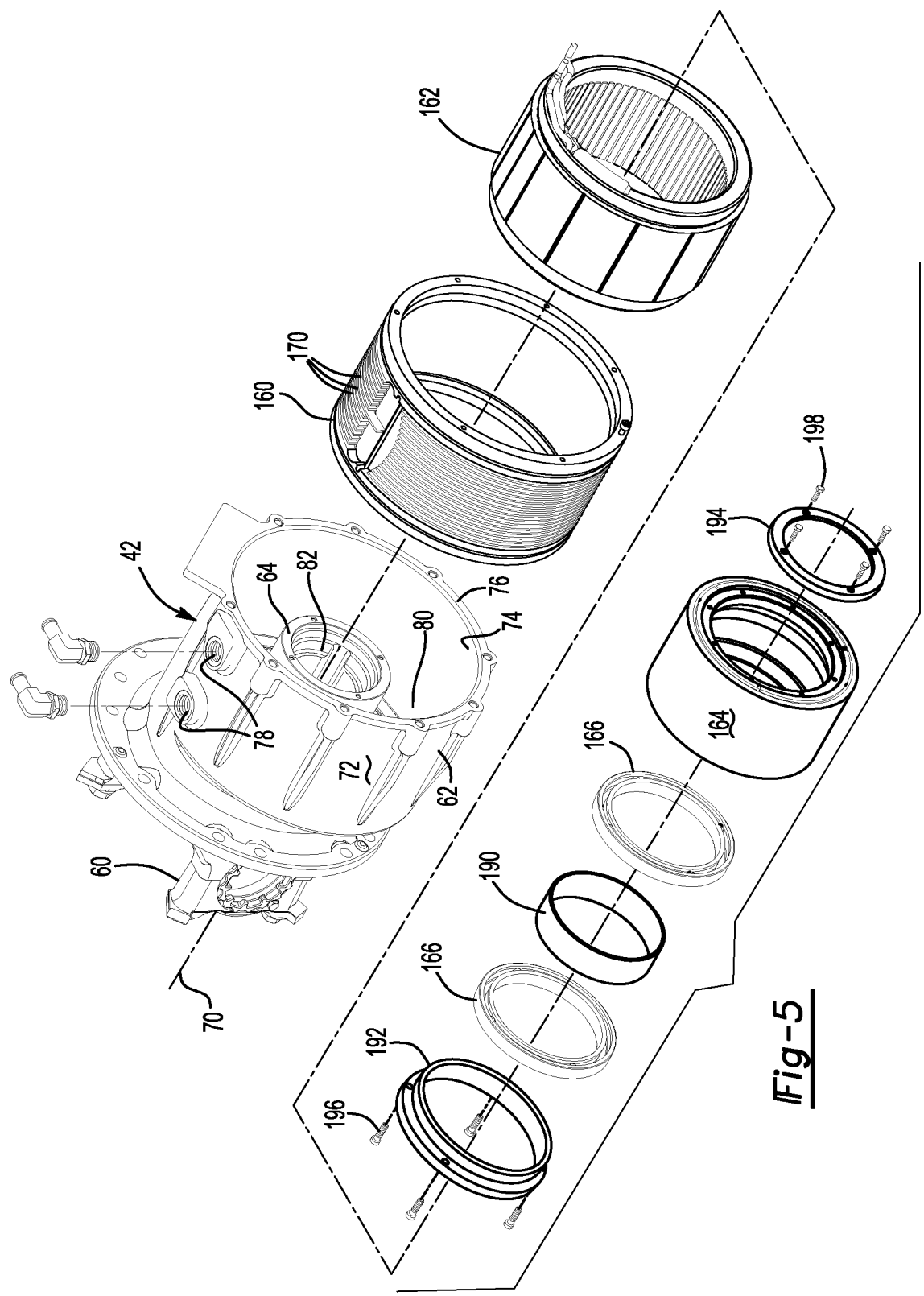

Referring to FIG. 5, the bearing support 60 may support a roller bearing assembly that may rotatably support the differential assembly 30. For example, two bearing supports 60 may be received in the center portion 50 and may be located proximate opposite sides of the differential assembly 30. The bearing support 60 may be provided in various configurations. For example, a bearing support 60 may include a pair of legs that extend from the differential carrier 42. A bearing cap may be mounted to the legs and may arch over a roller bearing assembly that may rotatably support the differential assembly 30. As another example, the bearing support 60 may be received in a roller bearing assembly which in turn may support the differential assembly 30.

The exterior wall 62 may extend away from the axle housing 40. The exterior wall 62 may extend around a first axis 70 and may have a generally cylindrical configuration. The exterior wall 62 may have an exterior surface 72, an interior surface 74, an end surface 76, and one or more ports 78.

The exterior surface 72 may face away from the first axis 70 and may define an exterior or outside surface of the differential carrier 42.

The interior surface 74 may be disposed opposite the exterior surface 72. The interior surface 74 may be disposed at a substantially constant radial distance from the first axis 70 in one or more configurations.

The end surface 76 may be disposed at an end of the differential carrier 42 that may be disposed opposite the axle housing 40. The end surface 76 may extend between the exterior surface 72 and the interior surface 74 and may facilitate mounting of the differential carrier cover 66 as will be discussed in more detail below.

One or more ports 78 may extend through the exterior wall 62. The ports 78 may be configured as a through holes that may extend from the exterior surface 72 to the interior surface 74. The ports 78 may allow coolant, such as a fluid like water, to flow to and from a water jacket as will be described in more detail below.

Referring to FIGS. 2 and 5, the bearing support wall 64 may extend away from the axle housing 40 and may extend around the first axis 70. The bearing support wall 64 may be spaced apart from the exterior wall 62 such that the exterior wall 62 may extend around the bearing support wall 64. In addition, the bearing support wall 64 may be radially positioned between the first axis 70 and the electric motor module 24. The bearing support wall 64 may cooperate with the exterior wall 62 to at least partially define an outer cavity 80. The outer cavity 80 may extend around the first axis 70 and may receive the electric motor module 24 as will be discussed in more detail below. The bearing support wall 64 may be completely disposed inside the differential carrier 42 and may not extend to the differential carrier cover 66. As such, the bearing support wall 64 may be spaced apart from and may not engage the differential carrier cover 66. In addition, the bearing support wall 64 may define a hole 82. The hole 82 may be disposed opposite the outer cavity 80 and may extend around or along the first axis 70.

Figure 15:
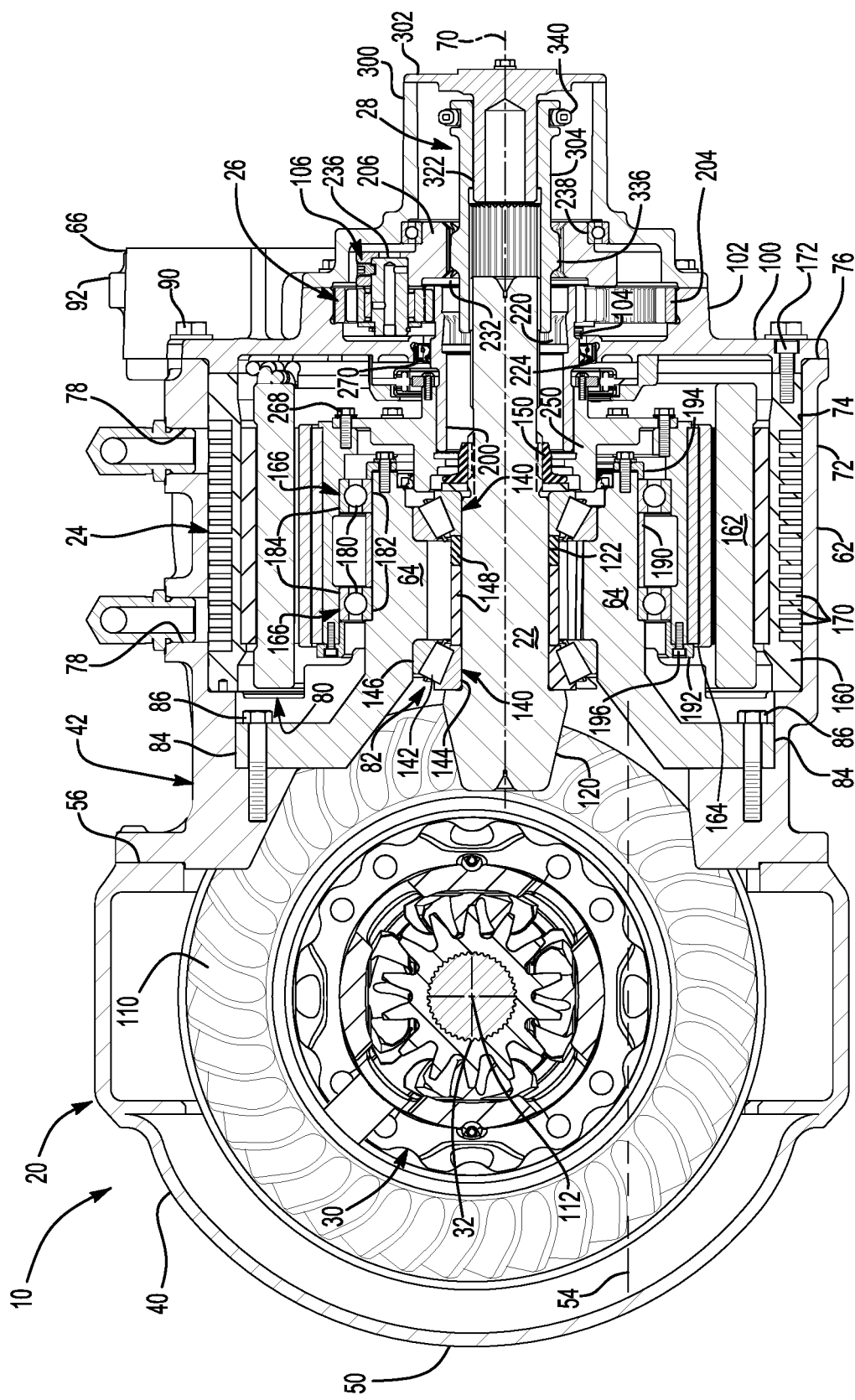
FIG. 15 is a section view of the axle assembly showing a differential carrier that has a bearing support wall that is a separate component from the differential carrier.

The bearing support wall 64 may be integrally formed with the differential carrier 42, such as is shown in FIG. 2. Alternatively, the bearing support wall 64 may be a separate component from the differential carrier 42, such as is shown in FIG. 15. For example, the bearing support wall 64 may include a mounting flange 84 that may extend away from the first axis 70. The mounting flange 84 may be attached to the differential carrier 42 with a plurality of fasteners 86, such as bolts. For example, the fasteners 86 may be arranged around the first axis 70 and may extend through the mounting flange 84 and into the differential carrier 42. The fasteners 86 may be axially positioned or positioned along the first axis 70 between the axle housing 40 and the electric motor module 24.

Referring to FIGS. 1 and 2, a differential carrier cover 66 may be disposed on an end of the differential carrier 42 that may be disposed opposite the axle housing 40. For example, the differential carrier cover 66 may be mounted to the end surface 76 of the exterior wall 62. The differential carrier cover 66 may be fixedly attached to the exterior wall 62 in any suitable manner, such as with one or more differential carrier cover fasteners 90, such as bolts. As is best shown in FIG. 1, the differential carrier cover 66 may partially define a junction box 92 that may receive components that may facilitate electrical connections to the electric motor module 24.

The differential carrier cover 66 may be provided in various configurations. For example, the differential carrier cover 66 may enclose an end of the differential carrier 42 and may not support a gear reduction module 26 in a configuration where a gear reduction module is not provided. Alternatively, the differential carrier cover 66 may support a gear reduction module 26. For instance, the differential carrier cover 66 may have a cover end wall 100 and a cover exterior wall 102 as is best shown with reference to FIGS. 2 and 8.

The cover end wall 100 may be disposed on and may be fastened to the end of the differential carrier 42. The cover end wall 100 may define a through hole 104 that may intersect the first axis 70.

The cover exterior wall 102 may extend from the cover end wall 100 in a direction that extends away from the differential carrier 42. The cover exterior wall 102 may extend around the first axis 70 and may have a generally cylindrical configuration. The cover exterior wall 102 may at least partially define a gear cavity 106. The gear cavity 106 may be disposed outside of the differential carrier 42 and may be disposed on an opposite side of the cover end wall 100 from the differential carrier 42.

Figure 6:
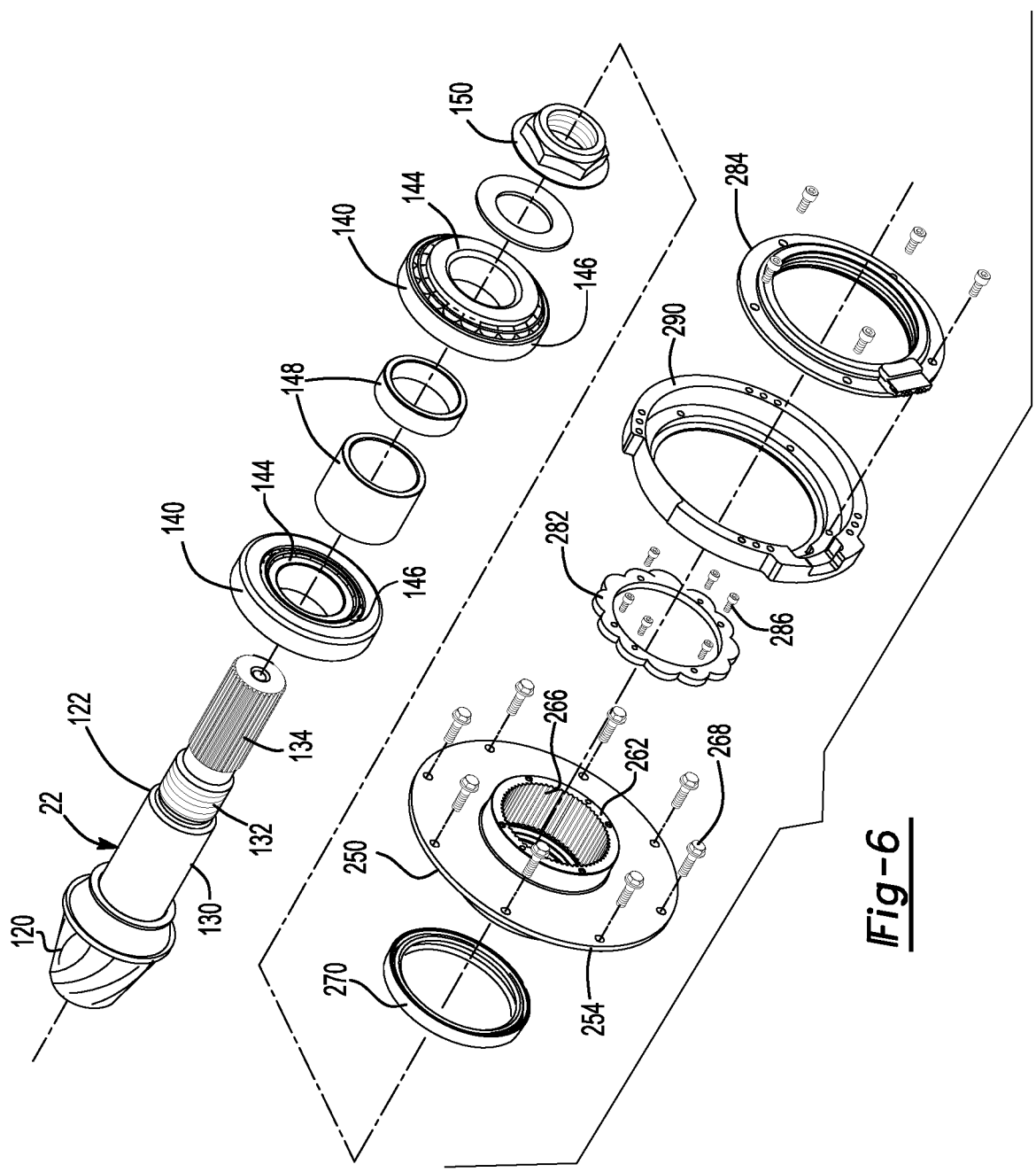
Figure 7:
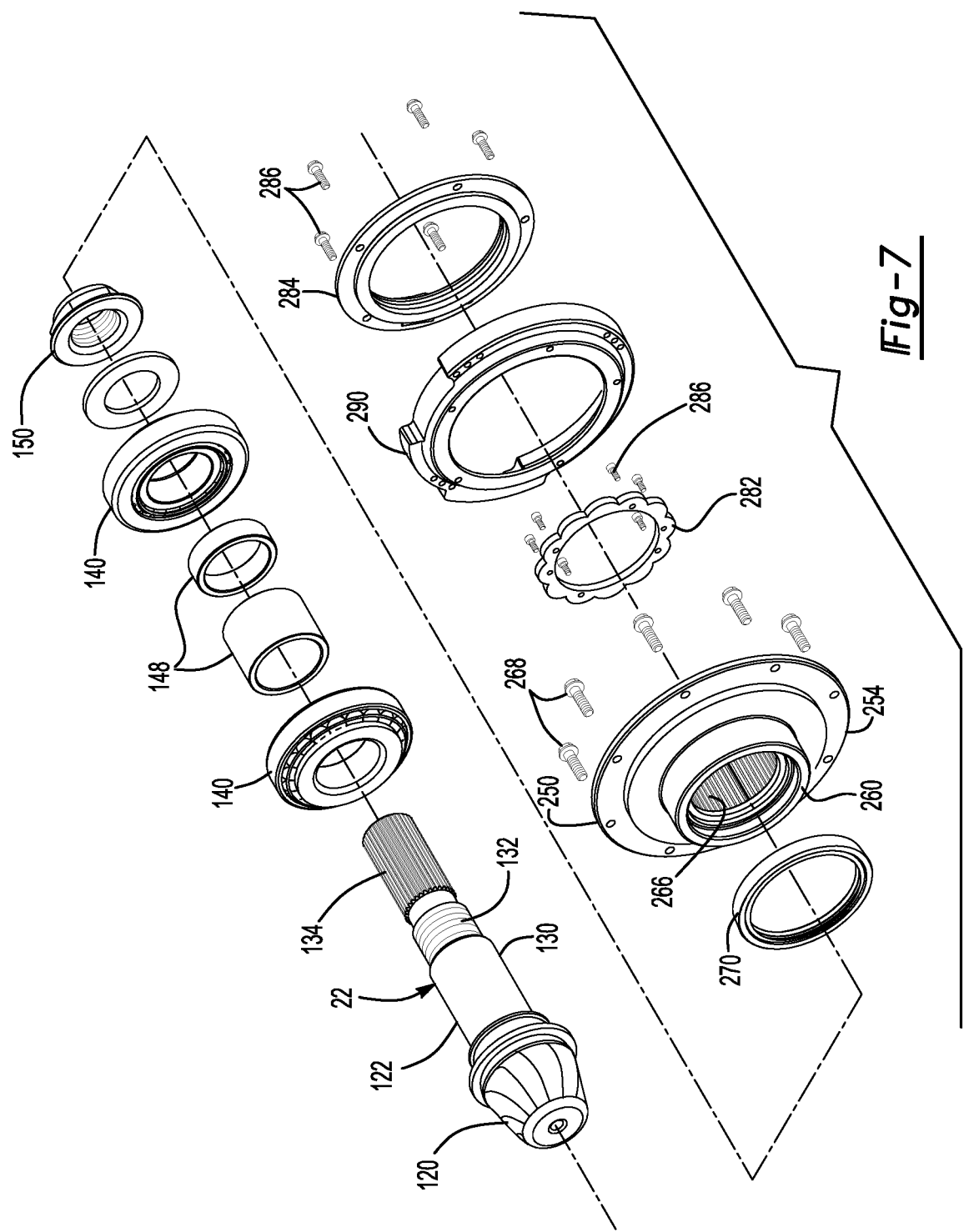

Referring to FIG. 2, the drive pinion 22 may provide torque to a ring gear 110 that may be provided with the differential assembly 30. The drive pinion 22 may extend along and may be rotatable about the first axis 70 while the ring gear 110 may be rotatable about a second axis 112. In addition, the drive pinion 22 may extend through the hole 82 in the bearing support wall 64 and through the through hole 104 in the differential carrier cover 66. In at least one configuration, such as is best shown in FIGS. 2, 6 and 7, the drive pinion 22 may include a gear portion 120 and a shaft portion 122.

The gear portion 120 may be disposed at or near an end of the shaft portion 122. The gear portion 120 may have a plurality of teeth that may mate with corresponding teeth on the ring gear 110. The gear portion 120 may be integrally formed with the shaft portion 122 or may be provided as a separate component that may be fixedly disposed on the shaft portion 122.

The shaft portion 122 may extend from the gear portion 120 in a direction that extends away from the axle housing 40. As is best shown with reference to FIGS. 6 and 7, the shaft portion 122 may include an outer surface 130, a threaded portion 132, and a spline 134.

The outer surface 130 may extend from the gear portion 120 and may be an outside circumference of a portion of the shaft portion 122. One or more drive pinion bearings 140 may be disposed on the outer surface 130 and may rotatably support the drive pinion 22. The drive pinion bearings 140 may have any suitable configuration. For instance, the drive pinion bearings 140 may be configured as roller bearing assemblies that may each include a plurality of rolling elements 142 that may be disposed between an inner race 144 and an outer race 146. The inner race 144 may extend around and may be disposed on the outer surface 130. The outer race 146 may extend around the rolling elements 142 and may be disposed on bearing support wall 64 of the differential carrier 42 and may be received in the hole 82 of the bearing support wall 64. One or more spacer rings 148 may be disposed between the inner races 144 of the drive pinion bearings 140 to inhibit axial movement of the drive pinion bearings 140 toward each other.

The threaded portion 132 may be axially positioned between the outer surface 130 and the spline 134. A preload nut 150 may be threaded onto the threaded portion 132 and may apply a preload force on the drive pinion bearings 140.

The spline 134 may be disposed between the threaded portion 132 and an end of the shaft portion 122 that may be disposed opposite the gear portion 120. The spline 134 may include a plurality of teeth. The teeth may be disposed substantially parallel to the first axis 70 and may mate with a corresponding spline on a collar of the shift mechanism 28 as will be discussed in more detail below. Alternatively, the teeth of the spline may mate with a corresponding spline of an adapter that may couple the drive pinion 22 to a rotor of the electric motor module 24 when the gear reduction module 26 and shift mechanism 28 are omitted.

Referring to FIG. 2, the electric motor module 24 may be operatively connected to the differential assembly 30 and may provide torque to the differential assembly 30 via the drive pinion 22. The electric motor module 24 may be received inside the differential carrier 42. For example, the electric motor module 24 may be received in the outer cavity 80 of the differential carrier 42. In addition, the electric motor module 24 may be axially positioned between the differential carrier cover 66 and the axle housing 40. As such, the electric motor module 24 may be completely received inside of the differential carrier 42. Positioning the electric motor module 24 inside the differential carrier 42, as opposed to being mounted outside or to an end of the differential carrier 42, may help reduce the axial length or standout of the axle assembly 10, which may reduce package space, and may position the center of mass of the axle assembly 10 closer to the axle housing 40 and the second axis 112, which may help with balancing and mounting of the axle assembly 10. In at least one configuration, the electric motor module 24 may include a water jacket 160, a stator 162, a rotor 164, and one or more rotor bearings 166.

Referring to FIGS. 2 and 5, the water jacket 160 may help cool or remove heat from the stator 162. The water jacket 160 may be received in the outer cavity 80 and may extend around the first axis 70 and the stator 162. For example, the water jacket 160 may be press fit into the outer cavity 80 such that the water jacket 160 may be disposed against the interior surface 74 of the exterior wall 62 of the differential carrier 42. As such, water jacket 160 may be radially positioned between the exterior wall 62 and the stator 162. In at least one configuration, the water jacket 160 may include a plurality of channels 170 that may extend around the first axis 70. Coolant may be provided to the water jacket 160 via a first port 78 and may exit the water jacket 160 via a second port 78. For instance, coolant may flow from the first port 78 to the channels 170, receive heat as the coolant flows through the channels 170 and around the first axis 70, and exit at the second port 78. The water jacket 160 may extend axially from the differential carrier 42 to the differential carrier cover 66. The water jacket 160 may be fastened to the differential carrier cover 66 with one or more fasteners 172, such as bolts, that may extend through openings in the differential carrier cover 66 and into the water jacket 160. As another option, the water jacket or features of the water jacket like the channels 170 may be integrally formed with the differential carrier 42 rather than being provided as a separate component.

The stator 162 may be fixedly positioned with respect to the differential carrier 42. For example, the stator 162 may be received inside and may be fixedly disposed on the water jacket 160. The stator 162 may extend around the first axis 70 and may include a plurality of windings as is known by those skilled in the art.

The rotor 164 may extend around the first axis 70 and may be received inside the stator 162. The rotor 164 may be spaced apart from but disposed in close proximity to the stator 162. The rotor 164 may be rotatable about the first axis 70 with respect to the stator 162 and may include magnets or ferromagnetic material that may facilitate the generation of electrical current. The rotor 164 may be rotatably supported by the bearing support wall 64 and may be radially positioned between the bearing support wall 64 and the stator 162. The rotor 164 may be operatively connected to the drive pinion 22 with or without a gear reduction module 26. For instance, the rotor 164 may be operatively connected to the drive pinion 22 between the end of the bearing support wall 64 and the differential carrier cover 66, such as with an adapter as will be discussed in more detail below.

One or more rotor bearings 166 may rotatably support the rotor 164. In the configuration shown, two rotor bearings 166 are provided that may be spaced apart from each other. For convenience in reference, the rotor bearing 166 that may be disposed closest to the axle housing 40 may be referred to as a first rotor bearing while the rotor bearing 166 that may be disposed closest to the differential carrier cover 66 may be referred to as a second rotor bearing. The rotor bearings 166 may have any suitable configuration. For instance, the rotor bearings 166 may be configured as roller bearing assemblies that may each include a plurality of rolling elements 180 that may be disposed between an inner race 182 and an outer race 184. The inner race 182 may extend around and may receive the bearing support wall 64. The outer race 184 may extend around the rolling elements 180 and may be disposed on the rotor 164.

Various components may help position the rotor bearings 166 and inhibit axial movement of the rotor bearings 166 with respect to the bearing support wall 64 and/or inhibit axial movement of the rotor 164 with respect to the rotor bearings 166. These components may include a spacer ring 190, a first retaining member 192, and a second retaining member 194.

The spacer ring 190 may be disposed between the rotor bearings 166. For example, the spacer ring 190 may extend around the bearing support wall 64 and may engage the inner races 182 of the rotor bearings 166 to inhibit axial movement of the rotor bearings 166 toward each other.

The first retaining member 192 may inhibit axial movement of the rotor 164 toward the axle housing 40. In at least one configuration, the first retaining member 192 may be configured as a ring that may extend around the first axis 70 and that may have a generally L-shaped cross-section. The first retaining member 192 may be fixedly disposed on the rotor 164 in any suitable manner. For example, one or more fasteners 196, such as bolts, may couple the first retaining member 192 to the rotor 164. The first retaining member 192 may extend to the outer race 184 of the first rotor bearing 166, thereby inhibiting axial movement.

The second retaining member 194 may inhibit axial movement of the rotor 164 and one or more rotor bearings 166 away from the axle housing 40. In at least one configuration, the second retaining member 194 may be configured as a ring that may extend around the first axis 70 and that may have a generally L-shaped cross-section. The second retaining member 194 may be fixedly disposed on the bearing support wall 64 in any suitable manner. For example, one or more fasteners 198, such as bolts, may couple the second retaining member 194 to an end of the bearing support wall 64. The second retaining member 194 may extend to the inner race of the second rotor bearing 166, thereby inhibiting axial movement.

Referring to FIG. 2, the gear reduction module 26, if provided, may transmit torque from the electric motor module 24 to the differential assembly 30. As such, the gear reduction module 26 may be operatively connected to the electric motor module 24 and the differential assembly 30. The gear reduction module 26 may be primarily disposed outside of the differential carrier 42, thereby providing a modular construction that may be mounted to the differential carrier 42 when gear reduction is desired. Such a configuration may allow for a standardized construction of the differential carrier 42 and/or the electric motor module 24.

The gear reduction module 26 may be disposed adjacent to and may be mounted to the differential carrier cover 66. In addition, the gear reduction module 26 may be primarily received or at least partially received in the gear cavity 106 of the differential carrier cover 66. As such, the gear reduction module 26 may be primarily disposed outside of the differential carrier 42.

The gear reduction module 26 may be provided in various configurations, such as planetary gear set configurations and non-planetary gear set configurations. Referring to FIGS. 2-9, an example of a gear reduction module 26 that has a planetary gear set configuration is shown. In such a configuration, the gear reduction module may include a sun gear 200, at least one planet gear 202, a planetary ring gear 204, and a planet gear carrier 206.

Figure 8:
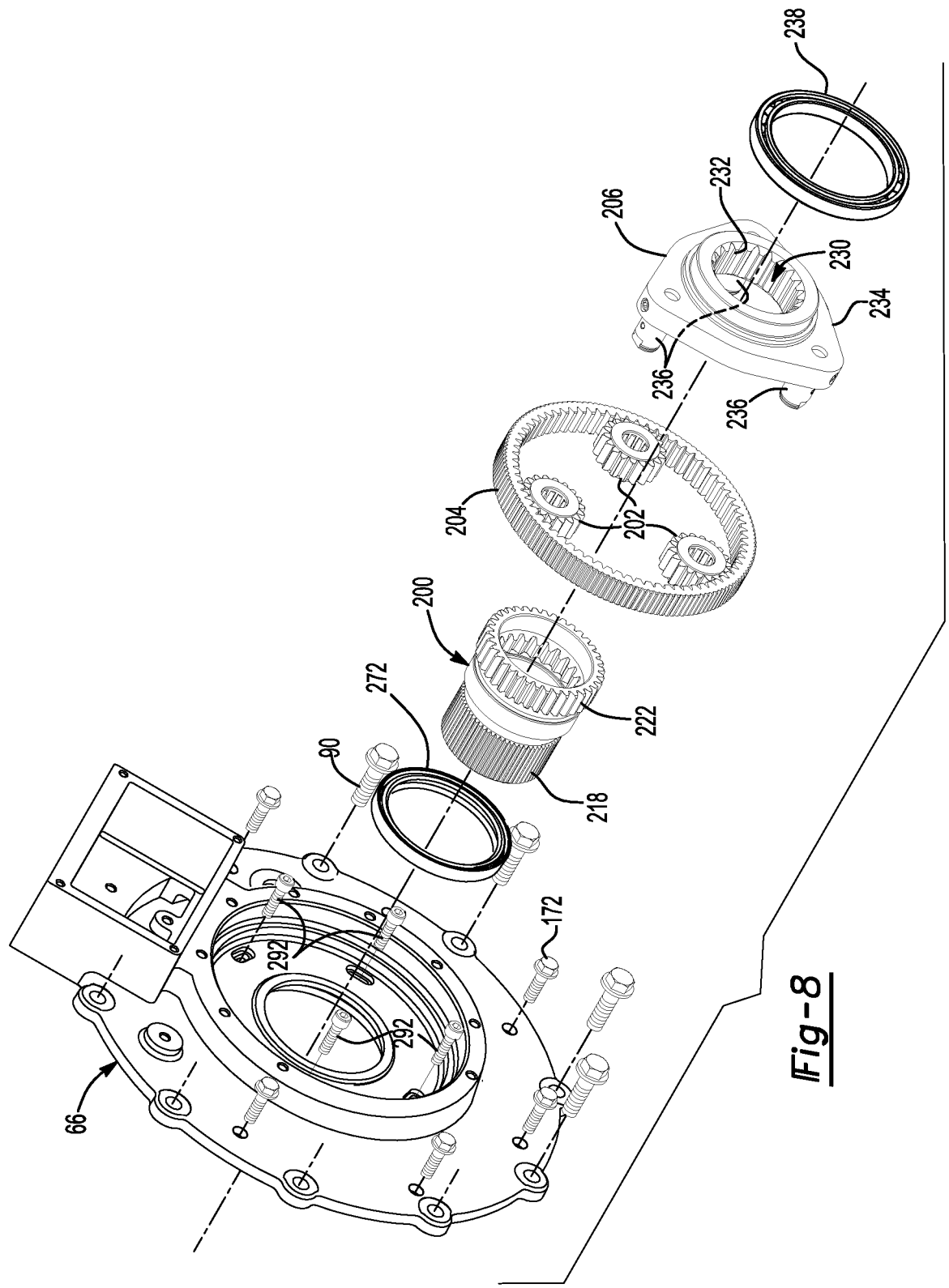

Referring to FIGS. 2, 8 and 13, the sun gear 200 may be disposed proximate the center of the planetary gear set and may be rotatable about the first axis 70. In addition, the sun gear 200 may extend through the through hole 104 in the cover end wall 100 of the differential carrier cover 66. As is best shown primarily with reference to FIG. 13, the sun gear 200 may be a hollow tubular body that may include a first end surface 210, a second end surface 212, a sun gear hole 214, an enlarged portion 216, a sun gear spline 218, a first gear portion 220, a second gear portion 222, and a seal mounting surface 224.

The first end surface 210 may be disposed at an end of the sun gear 200 that may face toward the axle housing 40. The first end surface 210 may be disposed in the differential carrier 42.

The second end surface 212 may be disposed at an end of the sun gear 200 that may face away from the axle housing 40. As such, the second end surface 212 may be disposed opposite the first end surface 210. The second end surface 212 may be disposed in the gear cavity 106 of the differential carrier cover 66.

The sun gear hole 214 may extend from the first end surface 210 to the second end surface 212. The sun gear hole 214 may extend along and may be centered about the first axis 70. The drive pinion 22 may extend through the sun gear hole 214 and may be spaced apart from the sun gear 200.

The enlarged portion 216 may be a portion of the sun gear hole 214 that may extend from the second end surface 212 to the first gear portion 220. The enlarged portion 216 may have a larger diameter than the first gear portion 220 and a larger diameter than a collar that may selectively couple the gear reduction module 26 to the drive pinion 22 as will be discussed in more detail below.

The sun gear spline 218 may facilitate coupling of the sun gear 200 to an adapter as will be discussed in more detail below. In at least one configuration, the sun gear spline 218 may be disposed opposite the sun gear hole 214 and may extend from or may be disposed adjacent to the first end surface 210. As such, the sun gear spline 218 may be received inside the adapter 250. It is also contemplated that the sun gear spline 218 may be disposed in the sun gear hole 214. In such a configuration, the adapter may be received inside the first gear portion 220.

The first gear portion 220 may be disposed in the sun gear hole 214 between the first end surface 210 and the enlarged portion 216. Teeth of the first gear portion 220 may be arranged around the first axis 70 and may extend toward the first axis 70.

The second gear portion 222 may be disposed proximate the second end surface 212 of the sun gear 200. The second gear portion 222 may have teeth that may mesh with teeth of the planet gears 202. The teeth of the second gear portion 222 may be arranged around the first axis 70 and may extend away from the first axis 70.

The seal mounting surface 224 may be disposed between the sun gear spline 218 and the second gear portion 222. The seal mounting surface 224 may be a generally smooth surface that may face away from the first axis 70 and that may extend around the first axis 70.

Figure 9:
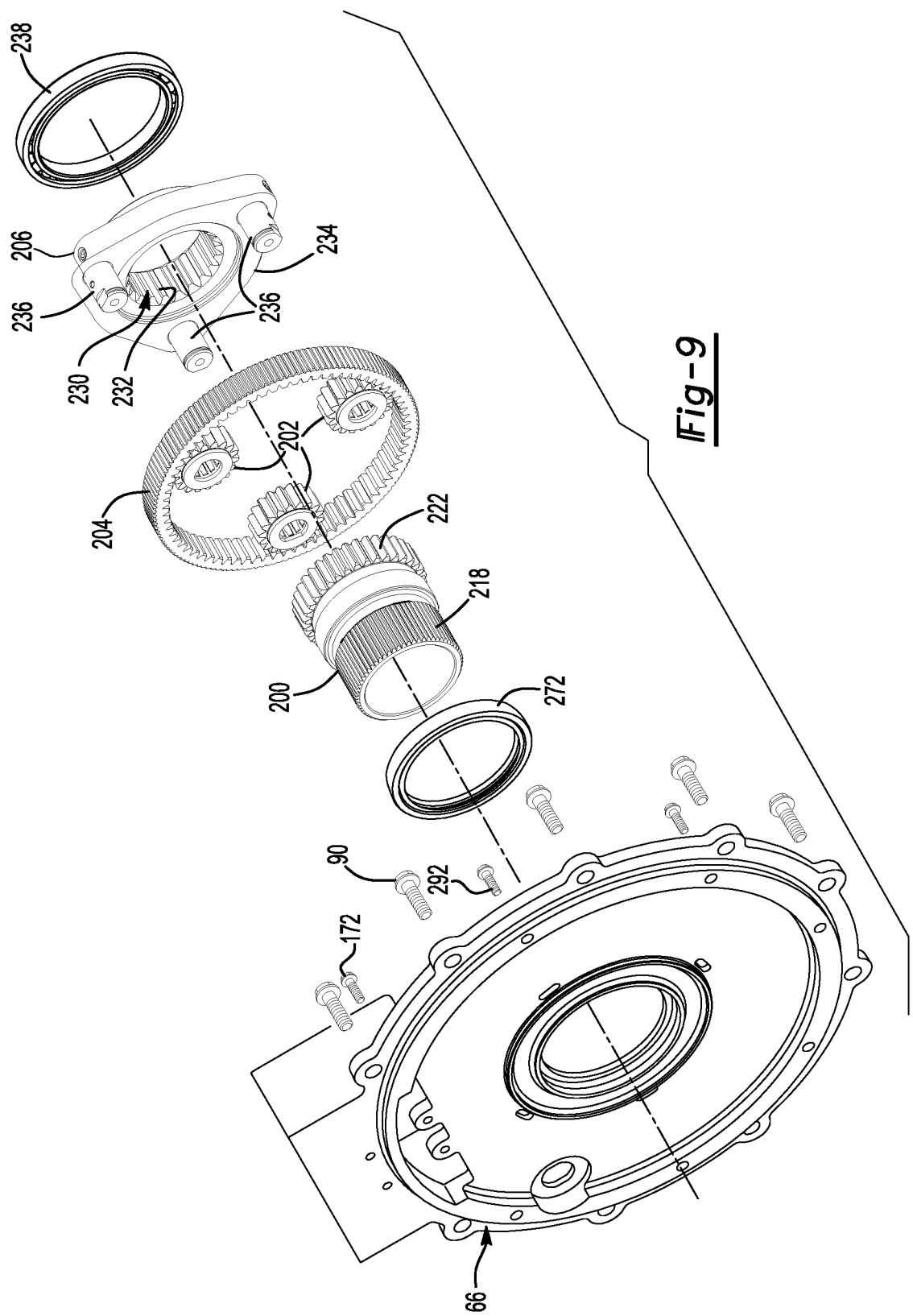

Referring to FIGS. 2, 8 and 9, one or more planet gears 202 may be rotatably disposed between the sun gear 200 and the planetary ring gear 204. Each planet gear 202 may have a hole and a set of teeth. The hole may be a through hole that may extend through the planet gear 202. The set of teeth may be disposed opposite the hole. The set of teeth may mesh with teeth of the second gear portion 222 of the sun gear 200 and teeth on the planetary ring gear 204. Each planet gear 202 may be configured to rotate about a different planet pinion axis. The planet pinion axes may extend substantially parallel to the first axis 70.

The planetary ring gear 204 may extend around the first axis 70 and may receive the planet gears 202. The planetary ring gear 204 may include a plurality of teeth that may extend toward the first axis 70 and may mesh with teeth on the planet gears 202. The planetary ring gear 204 may be fixedly positioned with respect to the differential carrier cover 66 and the first axis 70. For example, the planetary ring gear 204 may be received in the gear cavity 106 of the differential carrier cover 66 and may be fixedly disposed in the differential carrier cover 66 such that an outside circumference of the planetary ring gear 204 may be disposed on a side of the cover exterior wall 102 that faces toward the first axis 70.

The planet gear carrier 206 may be rotatable about the first axis 70 and may rotatably support the planet gears 202. In at least one configuration, the planet gear carrier 206 may include a planet gear carrier hole 230, a planet gear carrier gear portion 232, a planet gear carrier flange 234, and one or more pins 236.

The planet gear carrier hole 230 may be a through hole that may extend through planet gear carrier 206. The planet gear carrier hole 230 may extend along and may be centered about the first axis 70.

The planet gear carrier gear portion 232 may be disposed in the planet gear carrier hole 230. Teeth of the planet gear carrier gear portion 232 may be arranged around the first axis 70 and may extend toward the first axis 70.

The planet gear carrier flange 234 may be supposed on a side of the planet gear carrier 206 that may face away from the planet gears 202. A roller bearing assembly 238 may extend around the planet gear carrier flange 234 to rotatably support the planet gear carrier 206. The roller bearing assembly 238 may be disposed between the planet gear carrier flange 234 and a shift mechanism housing 300 that may be disposed on the differential carrier cover 66.

One or more pins 236 may rotatably support the planet gears 202. For example, a pin 236 may extend into or through the hole in a corresponding planet gear 202. A roller bearing may extend around each pin 236 and may be disposed between the pin 236 and a corresponding planet gear 202 in one or more embodiments.

Figure 16:
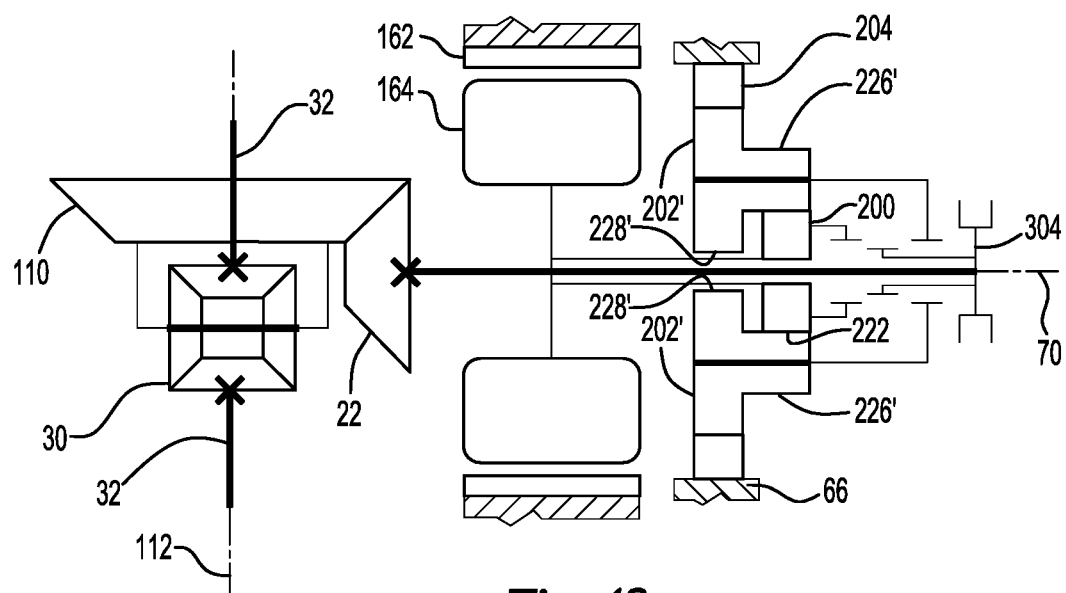
FIG. 16 is a schematic representation of compound planetary gear set that may be provided with a gear reduction module.

Referring to FIG. 16, an example of a gear reduction module that has a compound planetary gear set is shown. A compound planetary gear set configuration may include a sun gear 200, a planetary ring gear 204, and a planet gear carrier 206 as previously described. One or more planet gears 202' may be rotatably disposed between the sun gear 200 and the planetary ring gear 204. Each planet gear 202' may have a hole, a first set of teeth 226', and a second set of teeth 228'. The hole may be a through hole that may extend through the planet gear 202'. The first set of teeth 226' may be disposed opposite the hole and may mesh with teeth of the second gear portion 222 of the sun gear 200. The second set of teeth 228' may also be disposed opposite the hole and may mesh with the teeth of the planetary ring gear 204. The second set of teeth 228' may be arranged at a greater radial distance from the rotational axis of the planet gear 202' than the first set of teeth 226'.

Figure 17:
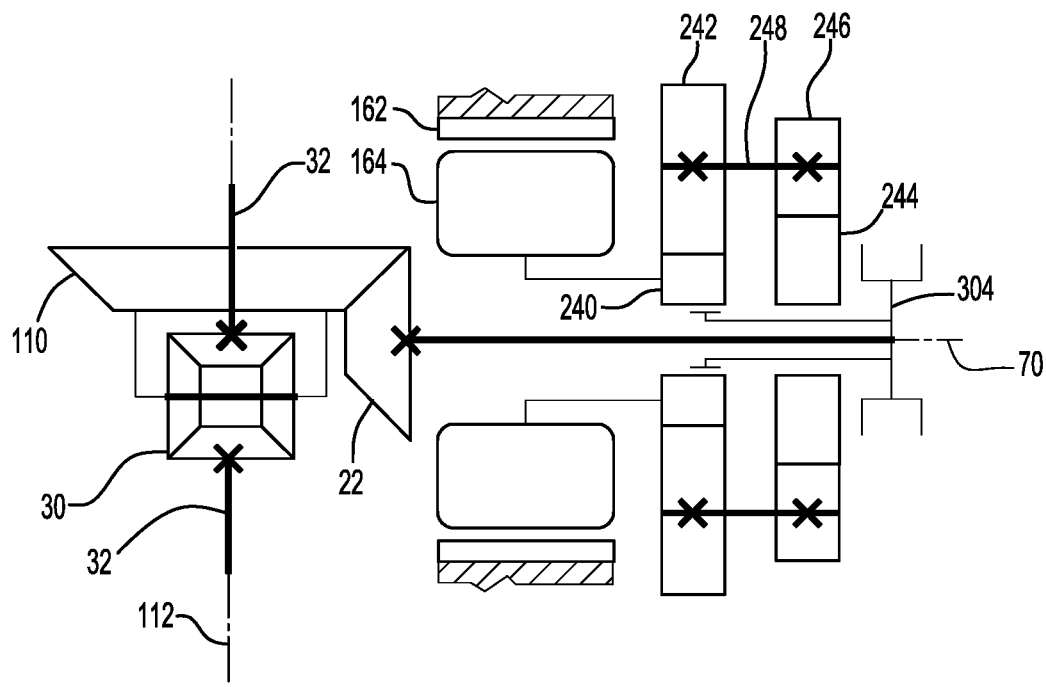
FIG. 17 is a schematically representation of a countershaft gear arrangement that may be provided with the gear reduction module.

Referring to FIG. 17, an example of a gear reduction module that has a countershaft gear arrangement is shown. In a countershaft arrangement, a plurality of gear sets, such as two sets of gears may be axially positioned adjacent to each other. The first set of gears may include a first inner gear 240 that may mesh with teeth on at least one first outer gear 242. The second set of gears may include a second inner gear 244 that may mesh with teeth on at least one second outer gear 246. The first inner gear 240 and the second inner gear 244 may be rotatable about the first axis 70. The first inner gear 240 may have a smaller diameter than the second inner gear 244. The first outer gear 242 may have a larger diameter than the second outer gear 246. A first outer gear 242 may be connected to a corresponding second outer gear 246 with a countershaft 248, which may also be called a layshaft, such that the first outer gear 242 and the second outer gear 246 may rotate about a common axis that may be spaced apart from the first axis 70. A clutch collar may selectively engage the first inner gear 240 or the second inner gear 244 to provide different gear ratios to the drive pinion 22. It is also contemplated that a countershaft gear arrangement may include a single countershaft rather than multiple countershafts as shown in FIG. 17.

Referring to FIGS. 2, 6, 7 and 12, an adapter 250 may couple the electric motor module 24 to the gear reduction module 26. For example, the adapter 250 may couple the rotor 164 to the sun gear 200. The adapter 250 may be disposed inside the differential carrier 42 and may be axially positioned between the axle housing 40 and the differential carrier cover 66. In at least one configuration, the adapter 250 may include a tubular body 252 and a flange portion 254.

The tubular body 252 may have a first end 260 and a second end 262 that may be disposed opposite the first end 260. The tubular body 252 may define an adapter hole 264 that may extend from the first end 260 to the second end 262. The adapter hole 264 may be a through hole that may extend along and may be centered about the first axis 70. The drive pinion 22 may extend through the adapter hole 264 and may be spaced apart from the adapter 250. The sun gear 200 may be received in the adapter hole 264. For example, the tubular body 252 may include an adapter spline 266 that may be disposed in the adapter hole 264. The adapter spline 266 may have teeth that may be arranged around the first axis 70 and may extend toward the first axis 70. The teeth of the adapter spline 266 may mate with the teeth of the sun gear spline 218 such that the adapter 250 may rotate about the first axis 70 with the sun gear 200 and the rotor 164.

The flange portion 254 may be disposed between the first end 260 and the second end 262 of the tubular body 252. The flange portion 254 may extend from the tubular body 252 in a direction that extends away from the first axis 70. The flange portion 254 may be fixedly coupled to the rotor 164. For instance, the flange portion 254 may include a set of holes that may be arranged around the first axis 70 and that may receive fasteners 268, such as bolts, that may extend through the holes to couple the flange portion 254 to the rotor 164.

Referring to FIGS. 2, 6 and 7, an adapter seal 270 may be disposed on the tubular body 252. The adapter seal 270 may be disposed proximate the first end 260 of the tubular body 252 and may extend around the tubular body 252. The adapter seal 270 may extend from the adapter 250 to the bearing support wall 64 of the differential carrier 42. As such, the adapter seal 270 may separate the outer cavity 80 of the differential carrier 42 from the hole 82 in the bearing support wall 64 to inhibit lubricant 54 from entering the outer cavity 80 and from flowing to the electric motor module 24.

Referring to FIGS. 2, 8 and 9, a sun gear seal 272 may also be provided to inhibit lubricant 54 from entering the outer cavity 80. The sun gear seal 272 may be disposed on and may extend around the seal mounting surface 224 of the sun gear 200. The sun gear seal 272 may extend from the sun gear 200 to the differential carrier cover 66. For example, the sun gear seal 272 may be received in the through hole 104 of the cover end wall 100 of the differential carrier cover 66.

Referring to FIGS. 2, 6 and 7 a rotary encoder 280 may be associated with the electric motor module 24. The rotary encoder 280 may be disposed near the electric motor module 24 and may also be isolated from the lubricant 54 due to the sealing provided by the adapter seal 270 and the sun gear seal 272. The rotary encoder 280 may be provided to detect rotation of the rotor 164. In at least one configuration, the rotary encoder 280 may include a rotary disc 282 and a sensor 284.

The rotary disc 282 may rotate about the first axis 70 with the rotor 164. The rotary disc 282 may be provided in any suitable location. In the configuration shown, the rotary disc 282 is fixedly mounted to the second end 262 of the tubular body 252 of the adapter 250 with fasteners 286, such as bolts. As such, the rotary disc 282 may extend around the sun gear 200 and may rotate with the rotor 164 and the adapter 250. In addition, the rotary disc 282 may be axially positioned between the flange portion 254 of the adapter 250 and the differential carrier cover 66. As such, the rotary disc 282 may be positioned between the bearing support wall 64 of the differential carrier 42 and the differential carrier cover 66. The rotary disc 282 may have a non-cylindrical outer surface that may face away from the first axis 70 that may include a plurality of protrusions that may extend away from the first axis 70.

The sensor 284 may extend around the rotary disc 282. The sensor 284 may detect rotation of the rotary disc 282 by detecting the presence or absence of the protrusions of the rotary disc 282. The sensor 284 may communicate with an electronic controller that may control operation of the electric motor module 24. The sensor 284 may have any suitable configuration. In the configuration shown, the sensor 284 is configured as a ring that may extend around the first axis 70. The sensor 284 may be fixedly mounted to a mounting plate 290 which in turn may be fixedly mounted to the differential carrier cover 66 with one or more fasteners 292, such as bolts, which are best shown in FIG. 8.

Referring to FIG. 2, the shift mechanism 28 may be disposed at an end of the axle assembly 10 that may be disposed opposite the axle housing 40. For example, the shift mechanism 28 may be disposed on the differential carrier cover 66.

The gear reduction module 26 may cooperate with the shift mechanism 28 to provide a desired gear reduction ratio to change the torque provided from the electric motor module 24 to the differential assembly 30, and hence to the axle shafts 32 of the axle assembly 10. For example, the gear reduction module 26 may provide a first drive gear ratio and a second drive gear ratio. The first drive gear ratio, which may be referred to as a low range gear ratio, may provide gear reduction from the electric motor module 24 to the differential assembly 30 and hence to the axle shafts 32. As a nonlimiting example, the first drive gear ratio may provide a 2:1 gear ratio or more. The first drive gear ratio may provide increased torque to a vehicle traction wheel as compared to the second drive gear ratio. The second drive gear ratio, which may be referred to as a high range gear ratio, may provide a different gear reduction ratio or lesser gear reduction ratio than the first drive gear ratio. For instance, the second drive gear ratio may provide a 1:1 gear ratio. The second drive gear ratio may facilitate faster vehicle cruising or a cruising gear ratio that may help improve fuel economy. In addition, a neutral drive gear ratio or neutral position may be provided in which torque may not be provided to the differential assembly 30 by the electric motor module 24.

Figure 10:
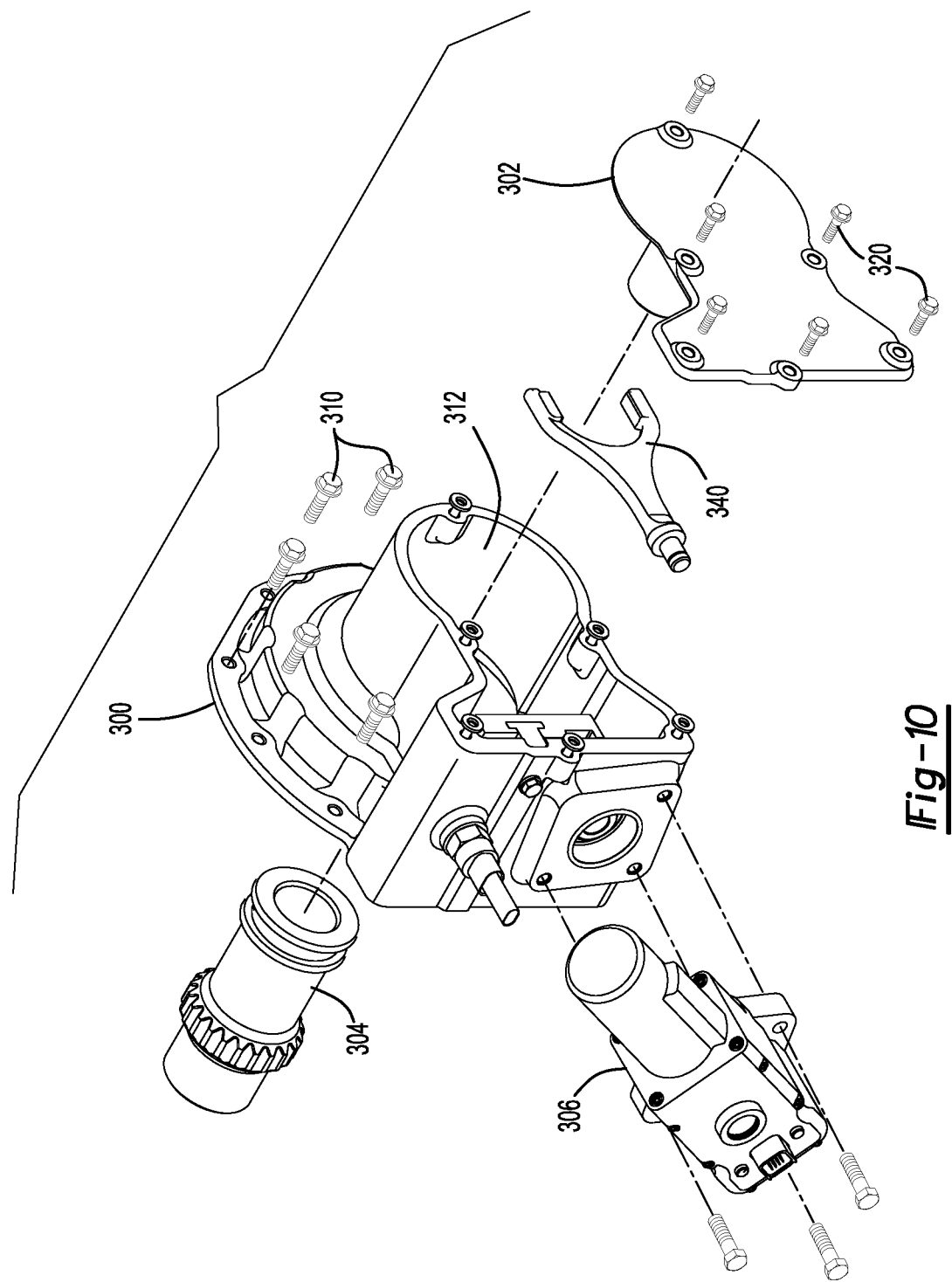

Referring to FIGS. 2, 10 and 11, the gear reduction module 26 may include a shift mechanism housing 300, an end plate 302, a collar 304, and an actuator 306.

The shift mechanism housing 300 may be disposed on the differential carrier cover 66 and may be mounted to a side of the differential carrier cover 66 that may be disposed opposite the differential carrier 42. For example, the shift mechanism housing 300 may be mounted to the cover exterior wall 102 of the differential carrier cover 66 with one or more fasteners 310, such as bolts. The shift mechanism housing 300 may cooperate with the differential carrier cover 66 to define the gear cavity 106. In addition, the shift mechanism housing 300 may facilitate mounting of the actuator 306 and may at least partially define a shift mechanism cavity 312 that may at least partially receive the collar 304. As is best shown in FIG. 2, the shift mechanism housing 300 may rotatably support the planet gear carrier 206 via the roller bearing assembly 238.

The end plate 302, which may also be referred to as an end cap, may be disposed on an end of the shift mechanism housing 300 that may be disposed opposite the axle housing 40. For example, the end plate 302 may be mounted to the shift mechanism housing 300 with a plurality of fasteners 320, such as bolts. The end plate 302 may rotatably support the collar 304. For example, the end plate 302 may have a support feature 322 that may be disposed on an interior surface of the end plate 302 and that may extend toward the differential carrier cover 66. The support feature 322 may be centered about the first axis 70 and may be substantially cylindrical in one or more configurations. The support feature 322 may be received in the collar 304 and may rotatably support the collar 304 such that the collar 304 may be rotatable about the support feature 322. The support feature 322 may be integrally formed with the end plate 302 or may be provided as a separate component.

Referring to FIG. 2, the collar 304, which may also be called a shift collar, may be at least partially received in the shift mechanism housing 300. For instance, the collar 304 may be at least partially received in the shift mechanism housing 300 and may extend through components of the gear reduction module 26, such as the planet gear carrier 206. In at least one configuration such as is best shown in FIG. 14, the collar 304 may include a collar hole 330, a collar spline 332, a collar groove 334, and a collar gear 336.

The collar hole 330 may extend through the collar 304 and may extend around the first axis 70. The collar hole 330 may receive the shaft portion 122 of the drive pinion 22.

The collar spline 332 may be disposed in the collar hole 330 and may be axially positioned near a first end of the collar 304 that may face toward the differential carrier 42. The collar spline 332 may extend toward the first axis 70 and may mate with the spline 134 of the drive pinion 22. The mating splines may allow the collar 304 to move in an axial direction or along the first axis 70 while inhibiting rotation of the collar 304 about the first axis 70 with respect to the drive pinion 22. Thus, the collar 304 may be rotatable about the first axis 70 with the drive pinion 22.

The collar groove 334 may be disposed proximate a second end of the collar 304 that may face toward the end plate 302. The collar groove 334 face away from the first axis 70 and may extend around the first axis 70. The collar groove 334 may receive a linkage 340, such as a shift fork, that may operatively connect the collar 304 to the actuator 306.

The collar gear 336 may be disposed between the first end and the second end of the collar 304. The collar gear 336 may have teeth that may be arranged around the first axis 70 and that may extend away from the first axis 70.

The collar 304 may be movably disposed on the drive pinion 22 and the support feature 322. More specifically, the collar 304 may move axially or in a direction that extends along the first axis 70 between a first position, a second position, and a third position. These positions are illustrated in FIGS. 2-4.

Referring to FIG. 2, the collar 304 is shown in the first position. In the first position, the collar 304 may couple the planet gear carrier 206 to the drive pinion 22. For example, the teeth of the collar gear 336 may mesh with the teeth of the planet gear carrier gear portion 232 of the planet gear carrier 206. As such, torque that is provided by the electric motor module 24 may be transmitted through the adapter 250, sun gear 200, planet gears 202, and planet gear carrier 206 to the collar 304 and from collar 304 to the drive pinion 22. The collar 304 may be disposed in the shift mechanism housing 300 and in the differential carrier cover 66 and may not extend into the differential carrier 42 when in the first position or a low range gear ratio is selected.

Figure 3:
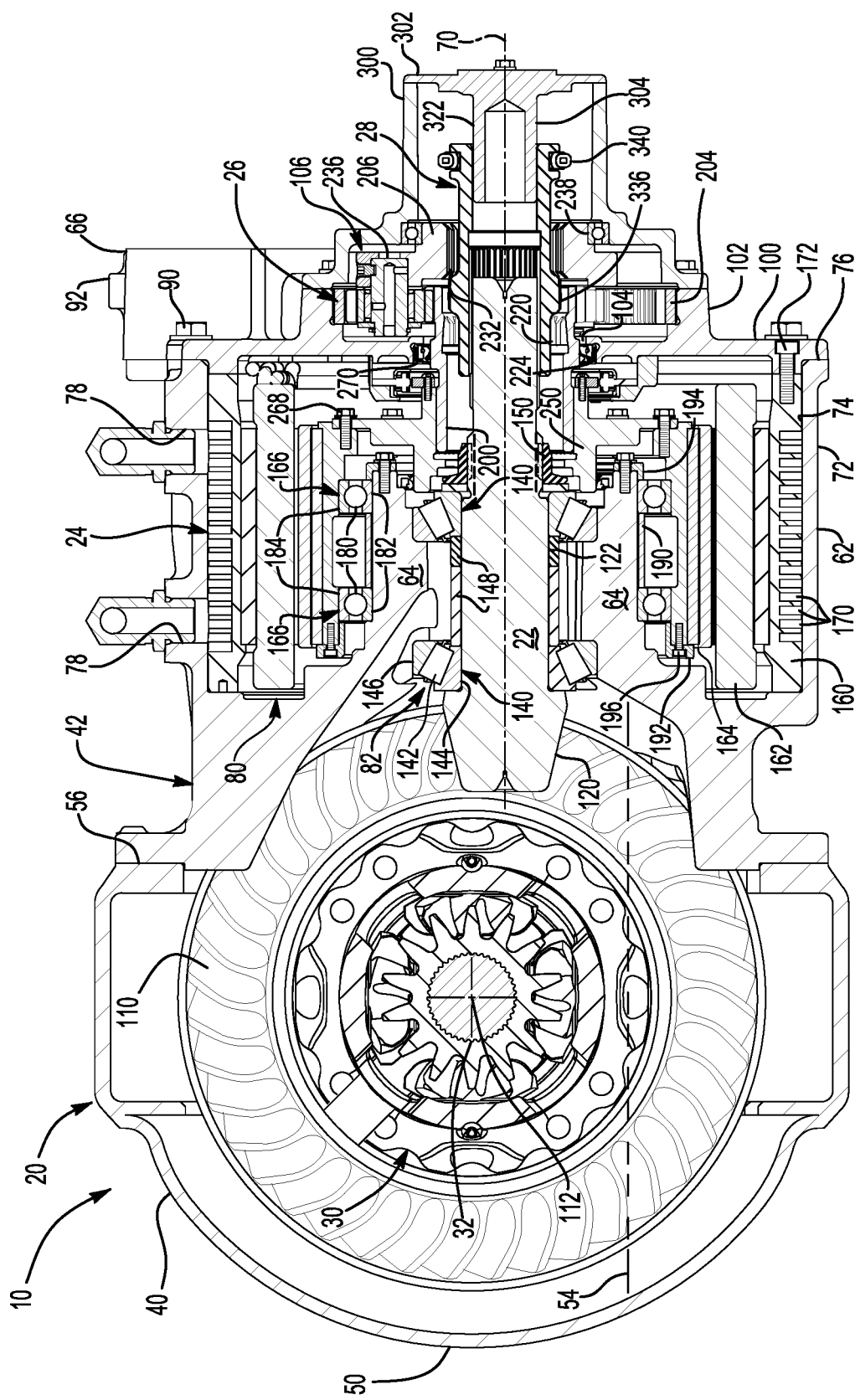
FIG. 3 is a section view of the axle assembly showing the collar in a second position.

Referring to FIG. 3, the collar 304 is shown in a second position or neutral position. The second position may be axially positioned between the first position and the third position. In the second position, the collar 304 may not couple the gear reduction module 26 to the drive pinion 22. For example, the teeth of the collar gear 336 may not mesh with the teeth of the sun gear 200 or the planet gear carrier 206. As such, torque that is provided by the electric motor module 24 may not be transmitted to the collar 304 or the drive pinion 22. The collar 304 may be disposed closer to the axle housing 40 when in the second position than when in the first position. The collar 304 may be axially positioned such that a portion of the collar 304 may extend through the differential carrier cover 66 and into the differential carrier 42 when the second position or neutral gear ratio is selected.

Figure 4:
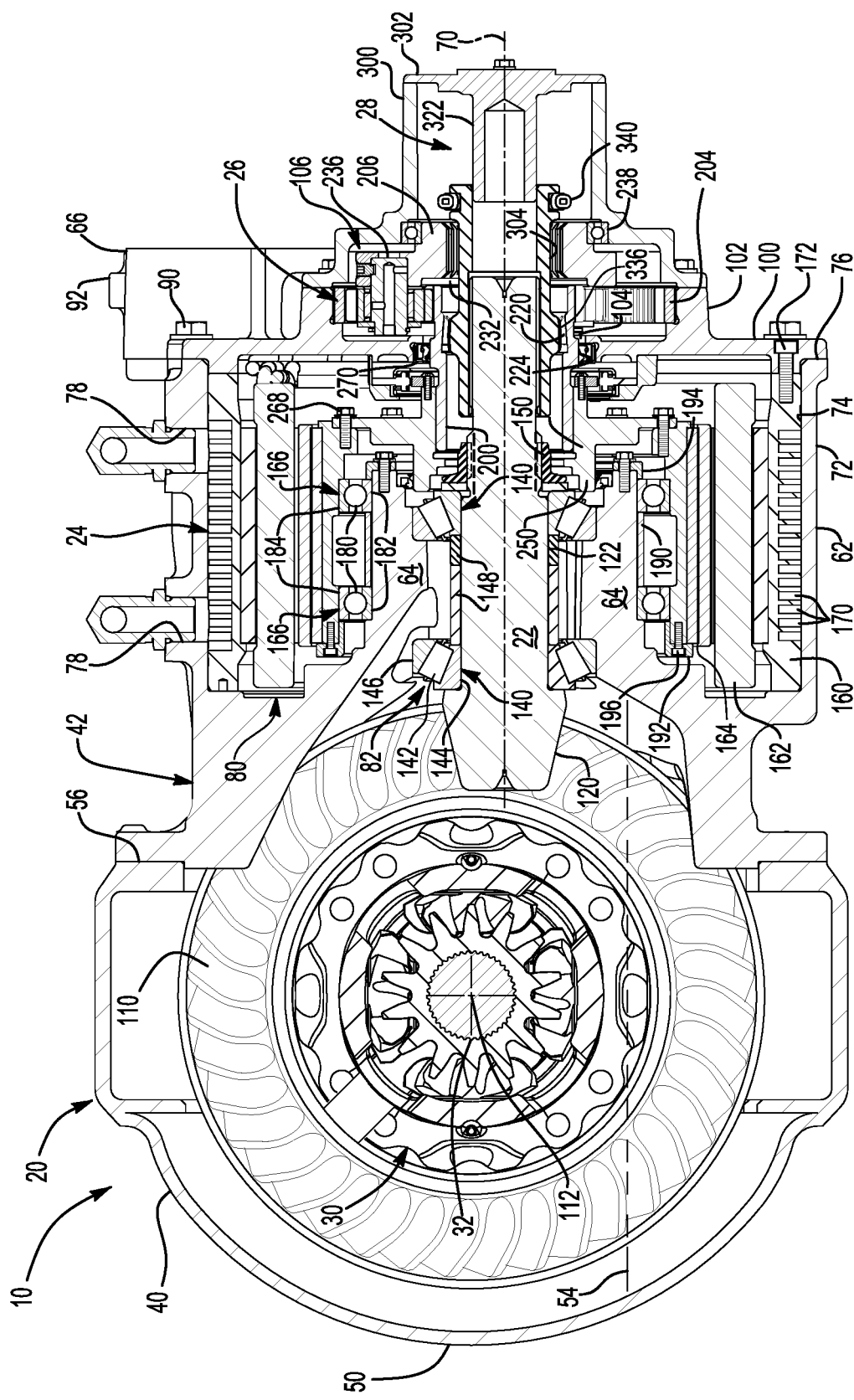
FIG. 4 is a section view of the axle assembly showing the collar in a third position.

Referring to FIG. 4, the collar 304 is shown in the third position. In the first position, the collar 304 may couple the sun gear 200 to the drive pinion 22. For example, the teeth of the collar gear 336 may mesh with the teeth of the second gear portion 222 of the sun gear 200. As such, torque that is provided by the electric motor module 24 may be transmitted through the adapter 250 and sun gear 200 to the collar 304 and from collar 304 to the drive pinion 22. The collar 304 may be disposed closer to the axle housing 40 when in the third position than when in the second position. The collar 304 may be axially positioned such that a portion of the collar 304 may extend through the differential carrier cover 66 and into the differential carrier 42 when the third position or high range gear ratio is selected.

It is also contemplated that the collar may be omitted such that the gear reduction module may provide a single gear ratio rather than multiple gear ratios. For example, the planet gear carrier 206 may be coupled to the drive pinion 22 to provide a low range gear ratio without a high range gear ratio.

The actuator 306 may be disposed on the shift mechanism housing 300. The actuator 306 may move the collar 304 along the first axis 70 between the first, second, and third positions. For example, the actuator 306 may be coupled to the collar 304 with the linkage 340. The actuator 306 may be of any suitable type. For example, the actuator 306 may be an electrical, electromechanical, pneumatic or hydraulic actuator.

An electronic controller may control operation of the actuator 306 and hence movement of the collar 304. An example of shifting of the collar 304 will now be discussed in the context of an axle assembly 10 that has a gear reduction module 26 having a planetary gear configuration. Starting with the collar 304 in the first position, the electronic controller may receive one or more inputs that may be indicative of speed (e.g., rotational speed of the rotor 164) and/or torque (e.g., torque provided by the electric motor). Shifting of the collar 304 from the first position to the second position or neutral position may be commenced when the speed and/or torque exceed predetermined threshold levels. Torque on the collar 304 may be temporarily relieved or reduced by controlling the rotational speed of the electric motor so that the collar 304 may more easily be actuated from the first position to the second position. The collar 304 may then be actuated from the second position to the third position. More specifically, the rotational speed of the collar 304 may be synchronized with the rotational speed of the sun gear 200 and then the actuator 306 may be controlled to move the collar 304 from the second position to the third position. The steps may be generally reversed to move the collar 304 from the third position to the first position. For instance, torque on the collar 304 may be temporarily relieved or reduced to allow the collar 304 to move from the third position to the second position and rotational speed of the collar 304 and planet gear carrier 206 may be synchronized to allow the collar 304 to move from the second position to the first position.

Figure 18:
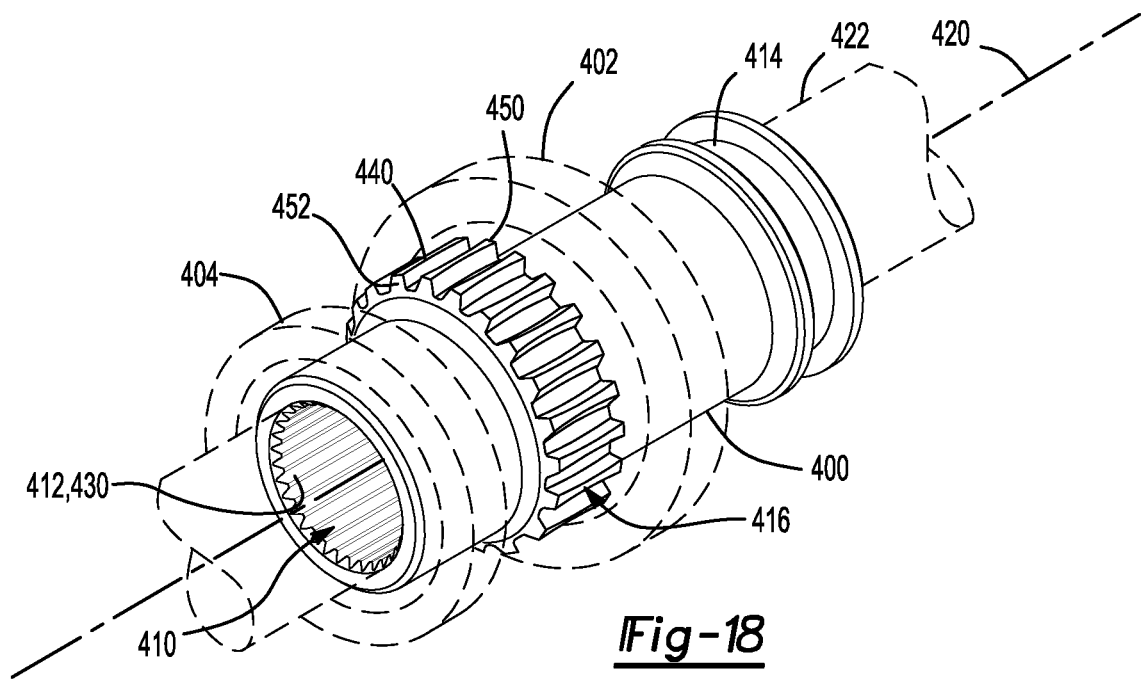
FIG. 18 is a perspective view of a collar.

Referring to FIG. 18, another example of a collar 400 is shown. The collar 400 may be part of a torque transmission apparatus that may transmit torque between a first drive component 402 and a second drive component 404. For example, the first drive component 402, the second drive component 404, or both, may be associated with an axle assembly that may have any suitable configuration. In FIG. 18, the first drive component 402 and the second drive component 404 are generically shown in phantom to allow the collar 400 to be more fully illustrated.

The first drive component 402 and the second drive component 404 may have any suitable configuration and may be provided at any suitable location along a torque transmission path, such as a torque transmission path of the axle assembly. For instance, the first drive component 402 and the second drive component 404 may be associated with or may be part of an interaxle differential unit, differential, input shaft, output shaft, axle shaft, gears of an axle assembly, or the like. The first drive component 402 and the second drive component 404 will be primarily discussed in the context of the first drive component 402 being part of a planetary gear set, such as planet gear carrier 206, and in the context of the second drive component 404 being another part of the planetary gear set, such as sun gear 200; however, it is to be understood that the first drive component 402 and the second drive component 404 may not be associated with a planetary gear set.

In at least one configuration, the collar 400 may include a collar hole 410, a collar spline 412, a collar groove 414, and a collar gear 416.

The collar hole 410 may be a through hole that may extend through the collar 400. The collar hole 410 may extend around and along an axis 420. The collar hole 410 may receive a shaft 422.

The shaft 422 may have any suitable configuration. For instance, the shaft 422 may be an input shaft, output shaft, axle shaft, or shaft that is integrally formed with or coupled to another component, such as a drive pinion, interaxle differential unit, a rotatable housing, or the like. For illustration purposes, the shaft 422 may be the shaft portion 122 of the drive pinion 22 and the axis 420 may be analogous to the first axis 70. The shaft 422 may be rotatable about the axis 420 and may extend along or around the axis 420. In addition, the shaft 422 may include a shaft spline 424. The shaft spline 424 may include a plurality of teeth. The teeth may extend substantially parallel to the axis 420 and may mate with the collar spline 412.

Figure 19:
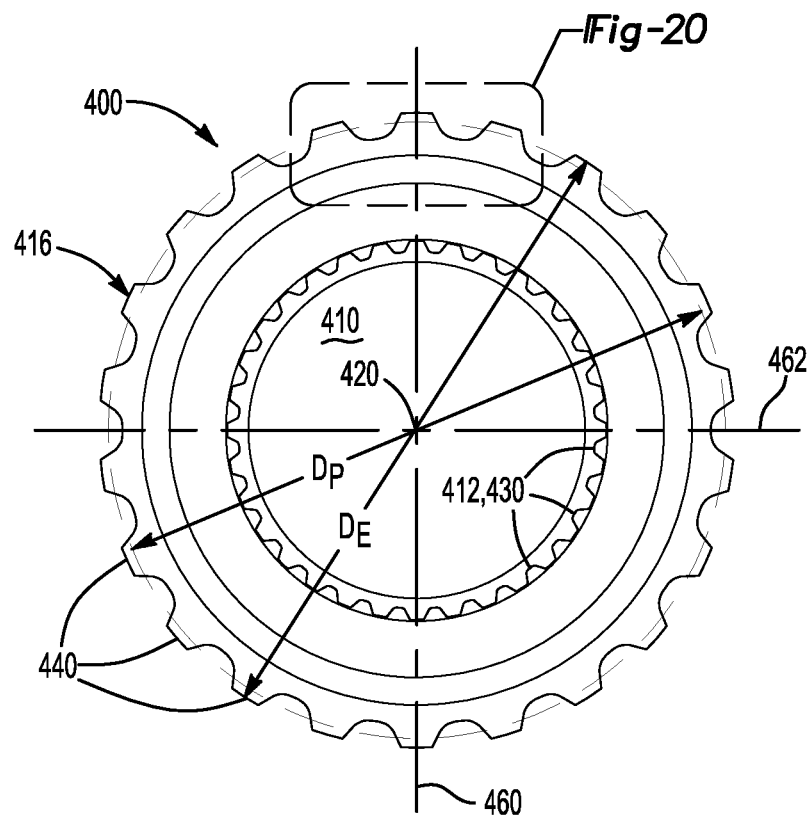
FIG. 19 is an end view of the collar of FIG. 18.

Referring to FIGS. 18 and 19, the collar spline 412 may be disposed in the collar hole 410. The collar spline 412 may have a plurality of collar spline teeth, which may also be referred to as a set of collar spline teeth 430. The collar spline teeth 430 may extend toward the axis 420 and may mate with the teeth of the shaft spline 424. The mating splines may allow the collar 400 to move in an axial direction or along the axis 420 while inhibiting rotation of the collar 400 about the axis 420 with respect to the shaft 422. Thus, the collar 400 may be rotatable about the axis 420 with the shaft 422 when the collar spline 412 mates with the shaft spline 424.

Referring to FIG. 18, the collar groove 414, if provided, may face away from the axis 420 and may extend around the axis 420. The collar groove 414 may receive a linkage, such as a shift fork, that may operatively connect the collar 400 to an actuator. The actuator may be of any suitable type, such as an electrical, electromechanical, pneumatic, or hydraulic actuator and may or may not have the same configuration as the actuator 306 described above.

Figure 20:
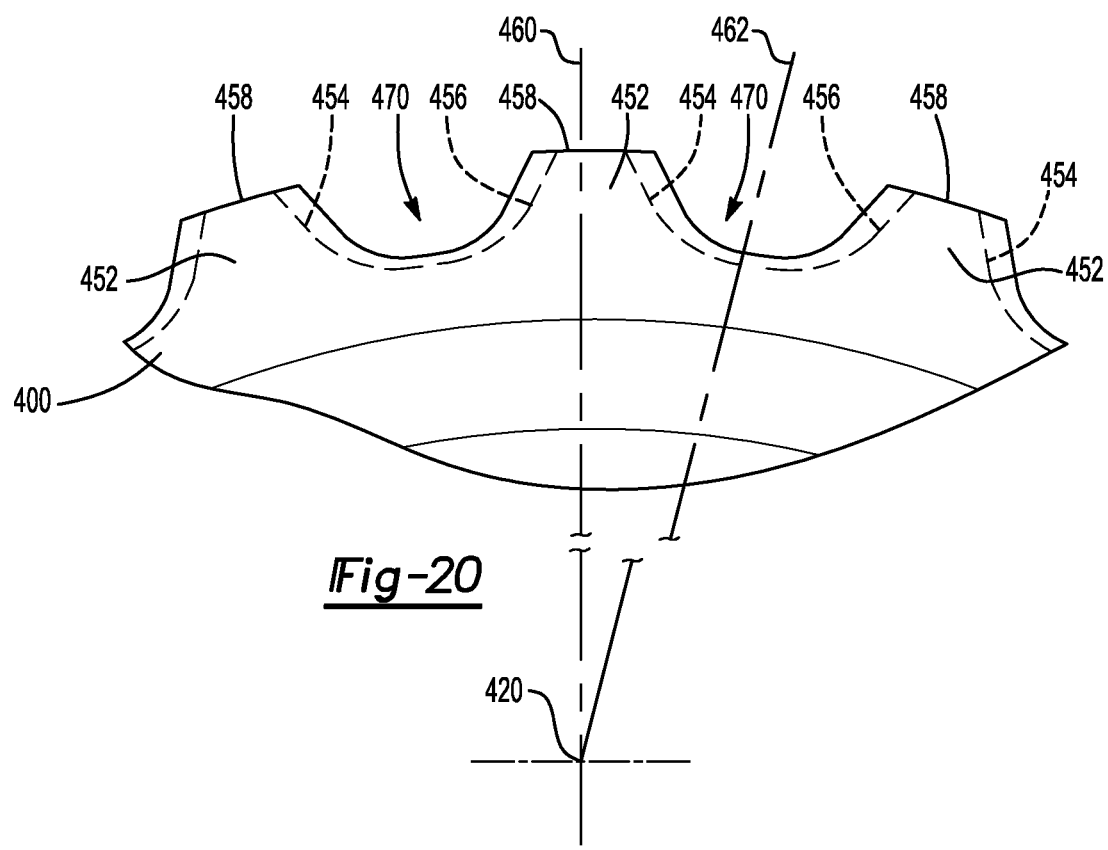
FIG. 20 is a magnified view of a portion of FIG. 19.
Figure 21:
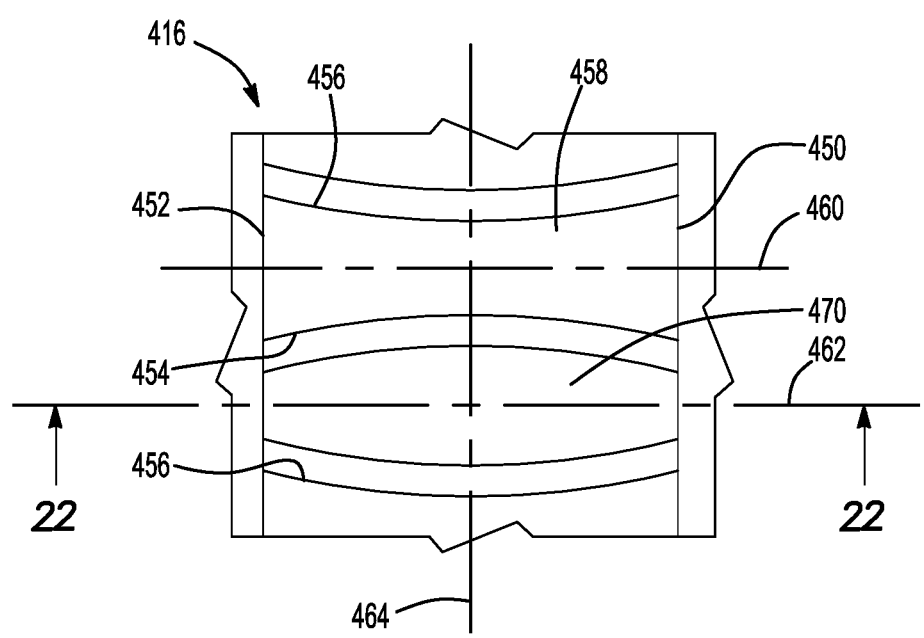
FIG. 21 is a plan view of collar teeth of the collar of FIG. 18.
Figure 27:
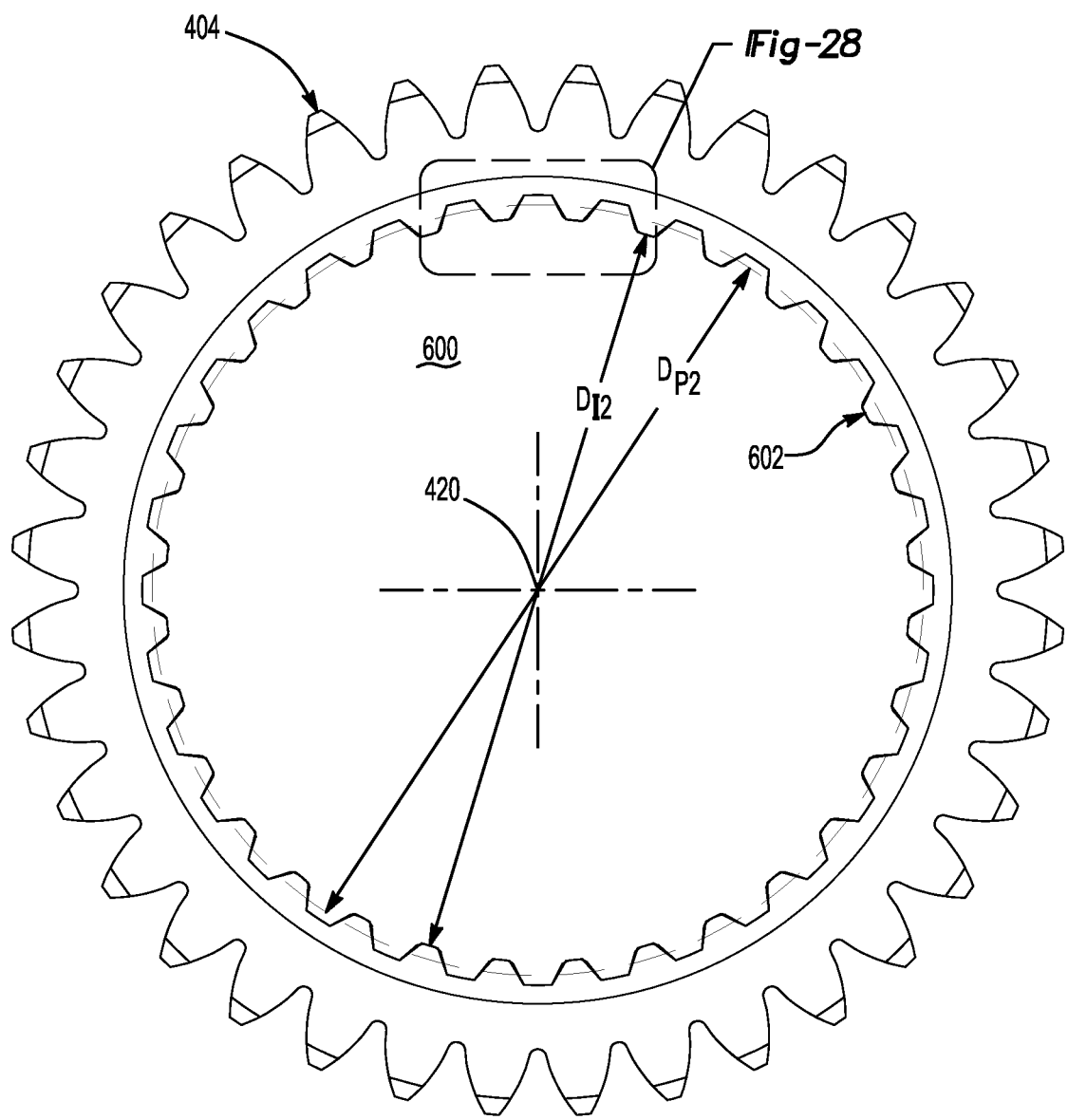
FIG. 27 is a side view of a second drive component.

Referring to FIGS. 18-22, the collar gear 416 may be disposed opposite the collar hole 410. The collar gear 416 may be disposed between a first end and a second end of the collar 400. The collar gear 416 may have a plurality of collar teeth, which may also be referred to as a set of collar teeth 440. The collar teeth 440 may be disposed opposite the collar hole 410 and may extend away from the axis 420. The collar teeth 440 may be arranged around the axis 420 in a repeating configuration or relationship. In at least one configuration, each collar tooth 440 may include a first end surface 450, a second end surface 452, a first collar side surface 454, a second collar side surface 456, and a tip surface 458. In addition, as is best shown in FIGS. 19-21, an outside diameter $D_E$, a pitch diameter $D_P$, a collar tooth bisecting plane 460, a gap bisecting plane 462, and a transverse collar tooth plane 464 may be associated with the collar teeth 440 of the collar gear 416.

The first end surface 450 may be disposed at a first end of the collar tooth 440. The first end surface 450 may extend away from the axis 420. For example, the first end surface 450 may extend from an exterior surface of the collar 400 in a direction that extends away from the axis 420 toward the tip surface 458 or to a first end of the tip surface 458. In the configuration shown, the first end surface 450 is depicted as being perpendicular to the axis 420; however, it is contemplated that the first end surface 450 may not be disposed perpendicular to the axis 420 in one or more configurations. For example, the first end surface 450 may be disposed at an angle with respect to the axis 420, similar to the configuration shown in FIG. 14, or may be curved or extend along an arc. The first end surface 450 may or may not be a planar surface.

The second end surface 452 may be disposed at a second end of the collar tooth 440. As such, the second end surface 452 may be disposed at an opposite end of the collar tooth 440 from the first end surface 450 and may be spaced apart from the first end surface 450. The second end surface 452 may extend away from the axis 420. For example, the second end surface 452 may extend from an exterior surface of the collar 400 in a direction that extends away from the axis 420 toward the tip surface 458 or to a second end of the tip surface 458 that may be disposed opposite the first end. In the configuration shown, the second end surface 452 is depicted as being perpendicular to the axis 420; however, it is contemplated that the second end surface 452 may not be disposed perpendicular to the axis 420 in one or more configurations. For example, the second end surface 452 may be disposed at an angle with respect to the axis 420, similar to the configuration shown in FIG. 14, or may be curved or extend along an arc. It is contemplated that the second end surface 452 may have mirror symmetry with the first end surface 450 about or with respect to the transverse collar tooth plane 464, which will be described in more detail below. The second end surface 452 may or may not be a planar surface.

The first collar side surface 454 may extend between the first end surface 450 and the second end surface 452. For example, the first collar side surface 454 may extend from the first end surface 450 to the second end surface 452. The first collar side surface 454 may be concave between the first end surface 450 and the second end surface 452 or concave from the first end surface 450 to the second end surface 452 as is best shown in FIGS. 18 and 21. As such, the first collar side surface 454 may be disposed further from the collar tooth bisecting plane 460 at or near the first end surface 450 and at or near the second end surface 452 than at locations that are disposed closer to the center of the collar tooth 440 and the transverse collar tooth plane 464. In at least one configuration, the first collar side surface 454 may be continuously curved from the first end surface 450 to the second end surface 452.

As is best shown in FIG. 20, the first collar side surface 454 may also extend from the tip surface 458 in a direction that extends toward the axis 420. Moreover, the first collar side surface 454 may be curved from the tip surface 458 to the root or bottom of the space or gap 470 between adjacent collar teeth 440. As such, the first collar side surface 454 may be curved from a first lateral end of the tip surface 458 to the gap bisecting plane 462. The first collar side surface 454 may have an involute configuration or involute cross section in one or more configurations.

The second collar side surface 456 may be disposed opposite the first collar side surface 454. The second collar side surface 456 may extend between the first end surface 450 and the second end surface 452. For example, the second collar side surface 456 may extend from the first end surface 450 to the second end surface 452. As such, the second collar side surface 456 may extend from an end or edge of the first end surface 450 that may be disposed opposite where the first end surface 450 intersects the first collar side surface 454 and may extend from an end or edge of the second end surface 452 that may be disposed opposite where the second end surface 452 intersects the first collar side surface 454. The second collar side surface 456 may be concave between the first end surface 450 and the second end surface 452 or concave from the first end surface 450 to the second end surface 452. As such, the second collar side surface 456 may be disposed further from the collar tooth bisecting plane 460 at or near the first end surface 450 and at or near the second end surface 452 than at locations that are disposed closer to the center of the collar tooth 440 and the transverse collar tooth plane 464. In at least one configuration, the second collar side surface 456 may be continuously curved from the first end surface 450 to the second end surface 452.

As is best shown in FIG. 20, the second collar side surface 456 may also extend from the tip surface 458 in a direction that extends toward the axis 420. Moreover, the second collar side surface 456 may be curved from the tip surface 458 to the root or bottom of the space or gap 470 disposed between adjacent collar teeth 440. As such, the second collar side surface 456 may be curved from a second lateral end of the tip surface 458 that may be disposed opposite the first lateral end to the gap bisecting plane 46. The second collar side surface 456 may have an involute configuration or involute cross section in one or more configurations.

The tip surface 458 may face away from the axis 420. In at least one configuration, the tip surface 458 may extend from the first end surface 450 to the second end surface 452 and may extend from the first collar side surface 454 to the second collar side surface 456. Referring to FIG. 19, the tip surface 458 may be disposed at an outside diameter $D_E$ of the collar gear 416. The outside diameter $D_E$, that may extend through the axis 420 and may extend from the tip surface 458 of one collar tooth 440 to the tip surface 458 of another collar tooth 440 disposed on an opposite side of the collar 400. Each collar tooth 440 may also have a pitch diameter $D_P$ that may be less than the outside diameter $D_E$ and may be greater than the root diameter as is known by those skilled in the art.

Referring to FIGS. 19-21, the collar tooth bisecting plane 460 may extend from the axis 420 and may bisect a collar tooth 440. For example, the collar tooth bisecting plane 460 may be a plane that may extend through the first end surface 450 and the second end surface 452 such that the axis 420 may be completely disposed in the collar tooth bisecting plane 460. As such, the collar tooth bisecting plane 460 may bisect the collar tooth 440, the first end surface 450, the second end surface 452, or combinations thereof. The first collar side surface 454 and the second collar side surface 456 may have mirror symmetry with respect to the collar tooth bisecting plane 460. In FIGS. 19 and 20, two examples of a collar tooth bisecting plane 460 are shown; however, it is to be understood that each collar tooth 440 is associated with a collar tooth bisecting plane 460. For example, each collar tooth 440 may have an individual collar tooth bisecting plane 460 or share a collar tooth bisecting plane 460 with another collar tooth 440 that may be disposed directly opposite the collar tooth 440.

The gap bisecting plane 462 may extend from the axis 420 and may bisect the space or gap 470 between adjacent collar teeth 440. For example, the gap bisecting plane 462 may be a plane that may be spaced apart from or disposed at an end of the first collar side surface 454 and the second collar side surface 456 of an adjacent collar tooth 440 such that the axis 420 may be completely disposed in the gap bisecting plane 462. The root diameter may be disposed in the gap bisecting plane 462.

Referring to FIG. 22, a cross section of the collar 400 along the gap bisecting plane 462 is shown. The collar 400 may have a concave cross section in the gap bisecting plane 462. For instance, the root or bottom of the gap 470 may be disposed further from the axis 420 at or near the first end surface 450 and the second end surface 452 than at locations closer to the transverse collar tooth plane 464. For example, the root or bottom of the gap 470 may be disposed at a first radial distance $R_E$ (also referred to as a root end radius) from the axis 420 where the root intersects the first end surface 450 and where the root intersects the second end surface 452. Each gap 470 may have an individual gap bisecting plane 462 or share a gap bisecting plane 462 with another gap 470 that may be disposed directly opposite the gap 470.

Referring to FIGS. 21 and 22, the transverse collar tooth plane 464 may be disposed perpendicular to the axis 420, the collar tooth bisecting plane 460, and the gap bisecting plane 462. The transverse collar tooth plane 464 may be axially positioned at the midpoint of the first collar side surface 454 and the second collar side surface 456. In addition, the transverse collar tooth plane 464 may be equidistantly spaced from the first end surface 450 and the second end surface 452. As such, the transverse collar tooth plane 464 may bisect a collar tooth 440 and a gap 470 between adjacent collar teeth 440 in an axial direction.

As is best shown in FIG. 21, the first collar side surface 454 and the second collar side surface 456 may be disposed closest to the collar tooth bisecting plane 460 at the transverse collar tooth plane 464. As such, the first collar side surface 454 and the second collar side surface 456 may be disposed closer to the collar tooth bisecting plane 460 at the transverse collar tooth plane 464 than at the first end surface 450, the second end surface 452, or points between the first end surface 450 and the transverse collar tooth plane 464 or points between the second end surface 452 and the transverse collar tooth plane 464. The first collar side surface 454 may have mirror symmetry about or with respect to the transverse collar tooth plane 464. Similarly, the second collar side surface 456 may have mirror symmetry about or with respect to the transverse collar tooth plane 464.

Referring to FIG. 22, the root may be disposed at a radial distance $R_M$ (which may be referred to as a root midpoint radius) where the gap bisecting plane 462 intersects the transverse collar tooth plane 464. The root midpoint radius $R_M$ may be less than the root end radius $R_E$. As such, the root may be disposed closer to the axis 420 where the gap bisecting plane 462 intersects the transverse collar tooth plane 464 than where the gap bisecting plane 462 intersects the first end surface 450 or the second end surface 452.

Referring to FIGS. 23-26 an example of the first drive component 402 is shown. The first drive component 402 may be selectively engageable with the collar 400. More specifically, the collar 400 may transmit torque between the shaft 422 and the first drive component 402 when the collar 400 and the first drive component 402 are meshingly engaged. In at least one configuration, the first drive component 402 may include a first opening 500 and a first set of teeth 502.

The first opening 500 may receive the collar 400. The first opening 500 may extend around and along the axis 420. The first opening 500 is depicted as a through hole that extends through the first drive component 402; however, it is also contemplated that the first opening 500 may be a blind hole in other configurations, such as a configuration in which the collar 400 and shaft 422 extend through the second drive component 404.

The first set of teeth 502 may be disposed in the first opening 500. The first set of teeth 502 may be selectively engageable with the set of collar teeth 440. The first set of teeth 502 may extend from the body of the first drive component 402 toward from the axis 420. The teeth 502 may be arranged around the axis 420 in a repeating configuration or relationship. In at least one configuration, each tooth 502 may include a first end 510, a second end 512, a first side surface 514, a second side surface 516, and a tip surface 518. In addition, as is best shown in FIGS. 24 and 25, a tooth bisecting plane 520, a gap bisecting plane 522, and a transverse tooth plane 524 may be associated with the teeth 502.

The first end 510 may be disposed at a first end of the tooth 502. The first end 510 may extend toward the axis 420. For example, the first end 510 may extend in a direction that extends toward the axis 420 toward the tip surface 518 or to a first end of the tip surface 518. In the configuration shown, the first end 510 is depicted as a surface that is perpendicular to the axis 420; however, it is contemplated that the first end 510 may not be disposed perpendicular to the axis 420 in one or more configurations. For example, the first end 510 may be disposed at an angle with respect to the axis 420, may be curved or extend along an arc. The first end 510 may or may not be a planar surface.

The second end 512 may be disposed at an opposite end of the tooth 502 from the first end 510. As such, the second end 512 may be spaced apart the first end 510. The second end 512 may extend toward the axis 420. For example, the second end 512 may extend in a direction that extends toward the axis 420 toward the tip surface 518 or to a second end of the tip surface 518 that may be disposed opposite the first end of the tip surface 518. In the configuration shown, the second end 512 is depicted as being perpendicular to the axis 420; however, it is contemplated that the second end 512 may not be disposed perpendicular to the axis 420 in one or more configurations. For example, the second end 512 may be disposed at an angle with respect to the axis 420 or may be curved or extend along an arc. It is also contemplated that the second end 512 may not be a surface but may be a location where the first side surface 514, second side surface 516, tip surface 518, or combinations thereof intersect and internal wall of the first drive component 402.

The first side surface 514 may extend between the first end 510 and the second end 512. For example, the first side surface 514 may extend from the first end 510 to the second end 512. The first side surface 514 may be convex between the first end 510 and the second end 512 or convex from the first end 510 to the second end 512 as is best shown in FIG. 25. The first side surface 514 may be disposed closer to the tooth bisecting plane 520 at or near the first end 510 than at or near the second end 512. Moreover, the distance from the tooth bisecting plane 520 to the first side surface 514 may progressively increase in a direction that extends axially from the first end 510 to the second end 512. The first side surface 514 may be a nonplanar surface that may be continuously curved from the first end 510 to the second end 512.

As is best shown in FIG. 26, the first side surface 514 may also extend from the tip surface 518 in a direction that extends away from the axis 420. Moreover, the first side surface 514 may be curved from the tip surface 518 to the root or bottom of the space or gap 530 between adjacent teeth 502. As such, the first side surface 514 may be curved from a first edge of the tip surface 518 to an adjacent gap bisecting plane 522. The first side surface 514 may have an involute configuration or involute cross-section in one or more configurations.

The second side surface 516 may be disposed opposite the first side surface 514. The second side surface 516 may extend between the first and 510 and the second end 512. For example, the second side surface 516 may extend from the first end 510 to the second end 512. The second side surface 516 may be convex between the first end 510 and the second end 512 or convex from the first end 510 to the second end 512 as is best shown in FIG. 25. The second side surface 516 may be disposed closer to the tooth bisecting plane 520 at or near the first end 510 than at or near the second end 512. Moreover, the distance from the tooth bisecting plane 520 to the second side surface 516 may progressively increase in a direction that extends axially from the first end 510 to the second end 512. Accordingly, the first side surface 514 may be disposed closer to the second side surface 516 at the first end 510 than at the second end 512. The second side surface 516 may be a nonplanar surface that may be continuously curved from the first end 510 to the second end 512.

As is best shown in FIG. 26, the second side surface 516 may also extend from the tip surface 518 in a direction that extends away from the axis 420. Moreover, the second side surface 516 may be curved from the tip surface 518 to the root or bottom of the gap 530 between adjacent teeth 502. As such, the second side surface 516 may be curved from a second edge of the tip surface 518 to an adjacent gap bisecting plane 522. The second side surface 516 may have an involute configuration or involute cross-section in one or more configurations.

The tip surface 518 may face toward the axis 420. In at least one configuration, the tip surface 518 may extend from the first end 510 to the second end 512 and may extend from the first side surface 514 to the second side surface 516. The tip surface 518 may be disposed at a constant radial distance from the axis 420. For example, the tip surface 518 may be disposed at an inside diameter $D_{I1}$ of the first set of teeth 502. The inside diameter $D_{I1}$ may extend through the axis 420. Each tooth 502 may also have a pitch diameter $D_{P1}$ that may be greater than the inside diameter $D_{I1}$ and may be less than the root diameter in a manner known by those skilled in the art.

Referring to FIGS. 24 and 25, the tooth bisecting plane 520 may extend from the axis 420 and may bisect a tooth 502. For example, the tooth bisecting plane 520 may be a plane that may extend through the first end 510 and the second end 512 such that the axis 420 may be completely disposed in the tooth bisecting plane 520. As such, the tooth bisecting plane 520 may bisect the tooth 502, first end 510, second end 512, or combinations thereof. The first side surface 514 and the second side surface 516 may have mirror symmetry with respect to the tooth bisecting plane 520. Each tooth 502 may have an individual tooth bisecting plane 520 or may share a tooth bisecting plane 520 with an opposing tooth 502 depending on the number of teeth that are provided.

The gap bisecting plane 522 may extend from the axis 420 and may bisect the space or gap 530 between adjacent teeth 502. For example, the gap bisecting plane 522 may be a plane that may be spaced apart from or may be disposed at an end of the first side surface 514 and the second side surface 516 of an adjacent tooth 502 such that the axis 420 may be completely disposed in the gap bisecting plane 522. The root diameter may be disposed in the gap bisecting plane 522.

Referring to FIG. 26, a cross section of the first drive component 402 along the gap bisecting plane 522 is shown. In at least one configuration, the first drive component 402 may have a concave cross section in the gap bisecting plane 522, which may facilitate cutting of the teeth 502. The root or bottom of the gap 530 may be disposed further from the axis 420 and the tip surface 518 at the first end 510 than at the second end 512. For example, the root or bottom of the gap 530 may be disposed at a first root radius $R_{R1}$ from the axis 420 where the root intersects the first end 510 and may be disposed at a second root radius $R_{R2}$ from the axis 420 where the root intersects the second end 512. The first root radius $R_{R1}$ may be greater than the second root radius $R_{R2}$. Each gap 530 may have an individual gap bisecting plane 522 or may share a gap bisecting plane 522 with another gap 530 that may be disposed directly opposite the gap 530 depending on the positioning and number of teeth 502.

Referring to FIGS. 25 and 26, the transverse tooth plane 524 may be disposed perpendicular to the axis 420, the tooth bisecting plane 520, and the gap bisecting plane 522. The transverse tooth plane 524 may be axially positioned at the midpoint of the first side surface 514 and the second side surface 516. In addition, the transverse tooth plane 524 may be equidistantly spaced from the first end 510 and the second end 512. As such, the transverse tooth plane 524 may bisect a tooth 502 and the gap 530 between adjacent teeth 502 in an axial direction.

As is best shown in FIG. 25, the first side surface 514 and the second side surface 516 may be disposed closest to the tooth bisecting plane 520 at the first end 510, further from the tooth bisecting plane 520 at the transverse tooth plane 524, and even further from the tooth bisecting plane 520 at the second end 512. The first side surface 514 may not have mirror symmetry about or with respect to the transverse tooth plane 524. Similarly, the second side surface 516 may not have mirror symmetry about or with respect to the transverse tooth plane 524.

Referring to FIGS. 27-30 an example of the second drive component 404 is shown. The second drive component 404 may be spaced apart from the first drive component 402. The second drive component 404 may be selectively engageable with the collar 400. More specifically, the collar 400 may transmit torque between the shaft 422 and the second drive component 404 when the collar 400 and the second drive component 404 are meshingly engaged. In at least one configuration, the second drive component 404 may include a second opening 600 and a second set of teeth 602.

The second opening 600 may receive the collar 400. The second opening 600 may extend around and along the axis 420. The second opening 600 is depicted as a through hole that extends through the second drive component 404; however, it is also contemplated that the second opening 600 may be a blind hole in other configurations, such as a configuration in which the collar 400 and shaft 422 extend through the first drive component 402.

The second set of teeth 602 may be disposed in the second opening 600. The second set of teeth 602 may be selectively engageable with the set of collar teeth 440. The second set of teeth 602 may extend from the body of the second drive component 404 toward from the axis 420. The teeth 602 may be arranged around the axis 420 in a repeating configuration or relationship. In at least one configuration, each tooth 602 may include a third end 610, a fourth end 612, a first lateral side surface 614, a second lateral side surface 616, and a tip surface 618. In addition, as is best shown in FIGS. 28 and 29, a tooth bisecting plane 620 and, a gap bisecting plane 622, and a transverse tooth plane 624 may be associated with the teeth 602.

The third end 610 may be disposed at a first end of the tooth 602. The third end 610 may extend toward the axis 420. For example, the third end 610 may extend in a direction that extends toward the axis 420 toward the tip surface 618 or to a first end of the tip surface 618. In the configuration shown, the third end 610 is depicted as a surface that is perpendicular to the axis 420; however, it is contemplated that the third end 610 may not be disposed perpendicular to the axis 420 in one or more configurations. For example, the third end 610 may be disposed at an angle with respect to the axis 420, may be curved or extend along an arc. The third end 610 may or may not be a planar surface.

The fourth end 612 may be disposed at an opposite end of the tooth 602 from the third end 610. As such, the fourth end 612 may be spaced apart the third end 610. The fourth end 612 may extend toward the axis 420. For example, the fourth end 612 may extend in a direction that extends toward the axis 420 toward the tip surface 618 or to a second end of the tip surface 618 that may be disposed opposite the first end of the tip surface 618. In the configuration shown, the fourth end 612 is depicted as being perpendicular to the axis 420; however, it is contemplated that the fourth end 612 may not be disposed perpendicular to the axis 420 in one or more configurations. For example, the fourth end 612 may be disposed at an angle with respect to the axis 420 or may be curved or extend along an arc. It is also contemplated that the fourth end 612 may not be a surface but may be a location where the first lateral side surface 614, second lateral side surface 616, tip surface 618, or combinations thereof intersect and internal wall of the second drive component 404.

As is best shown with reference to FIG. 31A, the second end 512 and the fourth end 612 may face toward each other. For example, the second end 512 of the teeth 502 of the first drive component 402 may face toward the fourth end 612 of the teeth 602 of the second drive component 404. Optionally, the second end 512 may be disposed substantially parallel to the fourth end 612. Similarly, the first end 510 and the third end 610 may face away from each other or may face in opposite directions.

The first lateral side surface 614 may extend between the third end 610 and the fourth end 612. For example, the first lateral side surface 614 may extend from the third end 610 to the fourth end 612. The first lateral side surface 614 may be convex between the third end 610 and the fourth end 612 or convex from the third end 610 to the fourth end 612 as is best shown in FIG. 29. The first lateral side surface 614 may be disposed closer to the tooth bisecting plane 620 at or near the third end 610 than at or near the fourth end 612. Moreover, the distance from the tooth bisecting plane 620 to the first lateral side surface 614 may progressively increase in a direction that extends axially from the third end 610 to the fourth end 612. The first lateral side surface 614 may be a nonplanar surface that may be continuously curved from the third end 610 to the fourth end 612.

As is best shown in FIG. 30, the first lateral side surface 614 may also extend from the tip surface 618 in a direction that extends away from the axis 420. Moreover, the first lateral side surface 614 may be curved from the tip surface 618 to the root or bottom of the space or gap 630 between adjacent teeth 602. As such, the first lateral side surface 614 may be curved from a first edge of the tip surface 618 to an adjacent gap bisecting plane 622. The first lateral side surface 614 may have an involute configuration or involute cross-section in one or more configurations.

The second lateral side surface 616 may be disposed opposite the first lateral side surface 614. The second lateral side surface 616 may extend between the third end 610 and the fourth end 612. For example, the second lateral side surface 616 may extend from the third end 610 to the fourth end 612. The second lateral side surface 616 may be convex between the third end 610 and the fourth end 612 or convex from the third end 610 to the fourth end 612 as is best shown in FIG. 29. The second lateral side surface 616 may be disposed closer to the tooth bisecting plane 620 at or near the third end 610 than at or near the fourth end 612. Moreover, the distance from the tooth bisecting plane 620 to the second lateral side surface 616 may progressively increase in a direction that extends axially from the third end 610 to the fourth end 612. Accordingly, the first lateral side surface 614 may be disposed closer to the second lateral side surface 616 at the third end 610 than at the fourth end 612. The second lateral side surface 616 may be a nonplanar surface that may be continuously curved from the third end 610 to the fourth end 612.

As is best shown in FIG. 26, the second lateral side surface 616 may also extend from the tip surface 618 in a direction that extends away from the axis 420. Moreover, the second lateral side surface 616 may be curved from the tip surface 618 to the root or bottom of the gap 630 between adjacent teeth 602. As such, the second lateral side surface 616 may be curved from a second edge of the tip surface 618 to an adjacent gap bisecting plane 622. The second lateral side surface 616 may have an involute configuration or involute cross-section in one or more configurations.

The tip surface 618 may face toward the axis 420. In at least one configuration, the tip surface 618 may extend from the third end 610 to the fourth end 612 and may extend from the first lateral side surface 614 to the second lateral side surface 616. The tip surface 618 may be disposed at a constant radial distance from the axis 420. For example, the tip surface 618 may be disposed at an inside diameter $D_{I2}$ of the first set of teeth 602. The inside diameter $D_{I2}$ may extend through the axis 420. Each tooth 602 may also have a pitch diameter $D_{P2}$ that may be greater than the inside diameter $D_{I2}$ and may be less than the root diameter in a manner known by those skilled in the art.

Referring to FIGS. 29 and 30, the tooth bisecting plane 620 may extend from the axis 420 and may bisect a tooth 602. For example, the tooth bisecting plane 620 may be a plane that may extend through the third end 610 and the fourth end 612 such that the axis 420 may be completely disposed in the tooth bisecting plane 620. As such, the tooth bisecting plane 620 may bisect the tooth 602, third end 610, fourth end 612, or combinations thereof. The first lateral side surface 614 and the second lateral side surface 616 may have mirror symmetry with respect to the tooth bisecting plane 620. Each tooth 602 may have an individual tooth bisecting plane 620 or may share a tooth bisecting plane 620 with an opposing tooth 602 depending on the number of teeth that are provided.

The gap bisecting plane 622 may extend from the axis 420 and may bisect the space or gap 630 between adjacent teeth 602. For example, the gap bisecting plane 622 may be a plane that may be spaced apart from or may be disposed at an end of the first lateral side surface 614 and the second lateral side surface 616 of an adjacent tooth 602 such that the axis 420 may be completely disposed in the gap bisecting plane 622. The root diameter may be disposed in the gap bisecting plane 622.

Referring to FIG. 30, a cross section of the second Drive component 404 along the gap bisecting plane 622 is shown. In at least one configuration, the second Drive component 404 may have a concave cross section in the gap bisecting plane 622, which may facilitate cutting of the teeth 602. The root or bottom of the gap 630 may be disposed further from the axis 420 and the tip surface 618 at the third end 610 than at the fourth end 612. For example, the root or bottom of the gap 630 may be disposed at a third root radius $R_{R3}$ from the axis 420 where the root intersects the third end 610 and may be disposed at a fourth root radius $R_{R4}$ from the axis 420 where the root intersects the fourth end 612. The third root radius $R_{R3}$ may be greater than the fourth root radius $R_{R4}$. Optionally, third root radius $R_{R3}$ may be the same as the first root radius $R_R$ and the fourth root radius $R_{R4}$ may be the same as the second root radius $R_{R2}$. Each gap 630 may have an individual gap bisecting plane 622 or may share a gap bisecting plane 622 with another gap 630 that may be disposed directly opposite the gap 630 depending on the positioning and number of teeth 602.

Referring to FIGS. 29 and 30, the transverse tooth plane 624 may be disposed perpendicular to the axis 420, the tooth bisecting plane 620, and the gap bisecting plane 622. The transverse tooth plane 624 may be axially positioned at the midpoint of the first lateral side surface 614 and the second lateral side surface 616. In addition, the transverse tooth plane 624 may be equidistantly spaced from the third end 610 and the fourth end 612. As such, the transverse tooth plane 624 may bisect a tooth 602 and the gap 630 between adjacent teeth 602 in an axial direction.

As is best shown in FIG. 29, the first lateral side surface 614 and the second lateral side surface 616 may be disposed closest to the tooth bisecting plane 620 at the third end 610, further from the tooth bisecting plane 620 at the transverse tooth plane 624, and even further from the tooth bisecting plane 620 at the fourth end 612. The first lateral side surface 614 may not have mirror symmetry about or with respect to the transverse tooth plane 624. Similarly, the second lateral side surface 616 may not have mirror symmetry about or with respect to the transverse tooth plane 624.

Referring to FIGS. 31-33, movement of the collar 400 with respect to the first drive component 402 and the second drive component 404 is illustrated. The collar 400 may move along the axis 420 between a first position, a second position, and a third position, similar to the position shown in FIGS. 2-4. FIGS. 31A-33A are section views associated with FIGS. 31-33, respectively. For clarity, the section views only illustrate sections of teeth of the first drive component 402 and the second drive component 404 and omit the shaft 422.

Referring to FIGS. 31 and 31A, the collar 400 is shown in a first position. The collar 400 may be axially positioned to engage or contact the first drive component 402 when in the first position. Moreover, the set of collar teeth 440 may mesh with the first set of teeth 502 when in the first position. As such, the collar 400 may transmit torque between the shaft 422 and the first drive component 402, but not between the shaft 422 and the second drive component 404 when the collar 400 is in the first position.

Referring to FIG. 31A, the gap between adjacent collar teeth 440 may be sufficiently wide to permit the teeth 502 of the first drive component 402 to fit between adjacent collar teeth 440 when the collar 400 moves along the axis 420, such as when the collar 400 moves between the first position and the second position. The collar 400 may move axially such that the teeth 502 of the first drive component 402 are at least partially positioned to the right of the transverse collar tooth plane 464 from the perspective shown. As such, the teeth 502 may be disposed closer to the first end surface 450 than the second end surface 452 of the collar teeth 440. Accordingly, the teeth 502 of the first drive component 402 may engage the collar teeth 440 of the collar 400 between the transverse collar tooth plane 464 and the first end surface 450 of the collar 400. For example, the teeth 502 of the first drive component 402 may engage or contact the collar teeth 440 such that the second end 512 of the teeth 502 may be disposed in the transverse collar tooth plane 464 or may be disposed between the transverse collar tooth plane 464 and the first end surface 450 of the collar teeth 440. As such, the teeth 502 of the first drive component 402 may engage the right half of the collar teeth 440 from the perspective shown in FIG. 31A.

Due to the size of the gap between adjacent collar teeth 440, either first collar side surface 454 or the second collar side surface 456 may engage or contact a member of the first set of teeth 502 when the collar teeth 440 mesh with the first set of teeth 502. For instance, the first collar side surface 454 may contact or engage the first side surface 514 of a tooth 502 (as shown in solid lines) or the second collar side surface 456 may contact or engage the second side surface 516 of a tooth 502 (as shown in phantom) depending on the rotational direction of the collar 400 or first drive component 402 about the axis 420. As examples, the first collar side surface 454 may contact or engage the first side surface 514 when the first drive component 402 rotates in a first rotational direction and the second collar side surface 456 may contact or engage the second side surface 516 when the first drive component 402 rotates in a second rotational direction that may be disposed opposite the first rotational direction.

The first set of teeth 502 may exert force on the collar teeth 440 in multiple directions or along different force vectors. For instance, a portion of the force exerted against a collar tooth 440 may be exerted axially or in a direction that may extend substantially parallel to the axis 420 as represented by force vector $F_A$ and a portion of the forced may be exerted in a direction that may be disposed perpendicular to the force vector $F_A$ as represented by force vector $F_T$. Force vector $F_A$ may extend toward the first end surface 450 and may help hold the collar 400 in engagement with a tooth 502 of the first drive component 402. As such, force vector $F_A$ may exert force in a first axial direction or to the right from the perspective shown and may help inhibit movement of the collar 400 in a second axial direction or to the left from the perspective shown. Force vector $F_T$ may generally extend in a direction of rotation of the first drive component 402 about the axis 420 and may extend toward a collar tooth 440 that is engaged by a tooth 502 and may represent rotational force that may be exerted by the first drive component 402 on the collar 400, which in turn may be transmitted to the shaft 422 to cause the shaft 422 to rotate with the collar 400.

Referring to FIGS. 32 and 32A, the collar 400 is shown in a second position. The collar 400 may be axially positioned between the first drive component 402 and the second drive component 404 when in the second position. The collar 400 may be spaced apart from the first drive component 402 and the second drive component 404 or may not meshingly engage the first drive component 402 and the second drive component 404 when in the second position. The collar 400 may not transmit torque between the shaft 422 and the first drive component 402 and the second drive component 404 when the collar 400 is in the second position.

Referring to FIGS. 33 and 33A, the collar 400 is shown in a third position. The collar 400 may be axially positioned to engage or contact the second drive component 404 when in the third position. Moreover, the set of collar teeth 440 may mesh with the second set of teeth 602 when in the third position. As such, the collar 400 may transmit torque between the shaft 422 and the second drive component 404, but not between the shaft 422 and the first drive component 402 when the collar 400 is in the third position.

Referring to FIG. 33A, the gap between adjacent collar teeth 440 may be sufficiently wide to permit the teeth 602 of the second drive component 404 to fit between adjacent collar teeth 440 when the collar 400 moves along the axis 420, such as when the collar 400 moves between the second position and the third position. The collar 400 may move axially such that the teeth 602 of the second drive component 404 are at least partially positioned to the left of the transverse collar tooth plane 464 from the perspective shown. As such, the teeth 602 may be disposed closer to the second end surface 452 than the first end surface 450 of the collar teeth 440. Accordingly, the teeth 602 of the second drive component 404 may engage the collar teeth 440 of the collar 400 between the transverse collar tooth plane 464 and the second end surface 452 of the collar 400. For example, the teeth 602 of the second drive component 404 may engage or contact the collar teeth 440 such that the fourth end 612 of the teeth 602 may be disposed in the transverse collar tooth plane 464 or may be disposed between the transverse collar tooth plane 464 and the second end surface 452 of the collar teeth 440. As such, the teeth 602 of the second drive component 404 may engage the left half of the collar teeth 440 from the perspective shown in FIG. 33A.

Due to the size of the gap between adjacent collar teeth 440, either first collar side surface 454 or the second collar side surface 456 may engage or contact a member of the second set of teeth 602 when the collar teeth 440 mesh with the second set of teeth 602. For instance, the first collar side surface 454 may contact or engage the first lateral side surface 614 of a tooth 602 (as shown in solid lines) or the second collar side surface 456 may contact or engage the second lateral side surface 616 of a tooth 602 (as shown in phantom) depending on the rotational direction of the collar 400 or second drive component 404 about the axis 420. As examples, the first collar side surface 454 may contact or engage the first lateral side surface 614 when the second drive component 404 rotates in a first rotational direction and the second collar side surface 456 may contact or engage the second lateral side surface 616 when the second drive component 404 rotates in a second rotational direction that may be disposed opposite the first rotational direction.

The second set of teeth 602 may exert force on the collar teeth 440 in multiple directions or along different force vectors. For instance, a portion of the force exerted against a collar tooth 440 may be exerted axially or in a direction that may extend substantially parallel to the axis 420 as represented by force vector $F_A$ and a portion of the forced may be exerted in a direction that may be disposed perpendicular to the force vector $F_A$ as represented by force vector $F_T$. Force vector $F_A$ may extend toward the second end surface 452 and may help hold the collar 400 in engagement with a tooth 602 of the second drive component 404. As such, force vector $F_A$ may exert force in the first axial direction or to the left from the perspective shown and may help inhibit movement of the collar 400 in the first axial direction or to the right from the perspective shown. Force vector $F_T$ may generally extend in a direction of rotation of the second drive component 404 about the axis 420 and may extend toward a collar tooth 440 that is engaged by a tooth 602 and may represent rotational force that may be exerted by the second drive component 404 on the collar 400, which in turn may be transmitted to the shaft 422 to cause the shaft 422 to rotate with the collar 400.

The concave configuration of the collar teeth 440 may cooperate with the convex configuration of the teeth 502 of the first drive component 402 and the convex configuration of the teeth 602 of the second drive component 404 to help inhibit disengagement due to the axial force (e.g. $F_A$). As a result, the collar teeth 440, teeth 502 of the first drive component 402, teeth 602 of the second drive component 404 and associated force vectors may allow these teeth to be provided without negative pressure angles that may otherwise be provided to help inhibit disengagement of the teeth, thereby reducing cost and manufacturing time as special machines, such as five axis CNC machines, and special cutting tools may be needed to cut teeth having a negative pressure angle geometry. Providing teeth without negative pressure angles may allow teeth to be manufactured using less expensive three axis CNC machines or by precision forging that may not require additional machining or less additional machining, which may reduce associated costs. Moreover, providing teeth without negative pressure angles may allow teeth to be provided without undercut faces which may help improve strength and durability of the teeth.

Referring to FIG. 2, the flow of lubricant 54 in the axle assembly 10 will now be described in more detail. Lubricant 54 may flow between the axle housing 40 in the shift mechanism housing 300 without entering the outer cavity 80 due to the sealing provided by the adapter seal 270 and the sun gear seal 272. As such, lubricant 54 that is splashed by the ring gear 110 may flow through the hole 82 in the differential carrier 42 to reach the gear cavity 106 and the shift mechanism housing 300. For example, lubricant 54 may flow between the axle housing 40 and the gear cavity 106 by flowing through the hole 82, drive pinion bearings 140, the adapter hole 264 of the adapter 250, and the sun gear hole 214 of the sun gear 200. Lubricant 54 may then be directed to the planet gears 202 in the roller bearing assembly 238 that may rotatably support the planet gear carrier 206. Some lubricant 54 may also accumulate in the bottom of the gear cavity 106 as shown.

Referring to FIG. 2, the differential assembly 30 may be at least partially received in the center portion 50 of the housing assembly 20. The differential assembly 30 may transmit torque to the vehicle traction wheel assemblies and permit the traction wheel assemblies to rotate at different velocities. The differential assembly 30 may be operatively connected to the axle shafts 32 and may permit the axle shafts 32 to rotate at different rotational speeds in a manner known by those skilled in the art. As such, the differential assembly 30 may receive torque via the ring gear 110 and provide torque to the axle shafts 32.

Referring to FIGS. 1 and 2, the axle shafts 32 may transmit torque from the differential assembly 30 to corresponding traction wheel assemblies. For example, two axle shafts 32 may be provided such that each axle shaft 32 extends through a different arm portion 52 of axle housing 40. The axle shafts 32 may extend along and may be rotated about the second axis 112 by the differential assembly 30. Each axle shaft 32 may have a first end and a second end. The first end may be operatively connected to the differential assembly 30. The second end may be disposed opposite the first end and may be operatively connected to a wheel end assembly that may have a wheel hub that may support a wheel. Optionally, gear reduction may be provided between an axle shaft and a wheel.

The axle assembly described above may allow an electric motor module to be assembled to or retrofitted on an existing axle housing. In addition, a gear reduction module or gear reduction module accompanied by a shift mechanism may optionally be provided to provide gear reduction that may improve vehicle traction at low speeds or on increased road grades. The modular end-to-end positioning of the gear reduction module and the shift mechanism may allow gear reduction modules and shift mechanisms to be added to or removed from an axle assembly to meet operating conditions or performance requirements. Moreover, the modular construction may allow components such as the differential carrier, differential carrier cover, and shift mechanism housing to be made of a lighter weight material, such as aluminum, as compared to the axle housing, which may help reduce weight and improve fuel economy. The removable end plate may also allow the axle assembly to be coupled to a drive shaft which may allow the axle assembly to be provided as part of a parallel hybrid driveline rather than an all-electric configuration.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A torque transmission apparatus comprising:
a shaft that extends along an axis and has a shaft spline;
a collar that includes:
    a collar hole that is disposed along the axis and receives the shaft;

a collar spline disposed in the collar hole that mates with the shaft spline; and
a set of collar teeth that are disposed opposite the collar hole, wherein the collar teeth include:
a first end surface that extends away from the axis;
a second end surface that extends away from the axis and is disposed opposite the first end surface;
a first collar side surface that is concave between the first end surface and the second end surface; and
a second collar side surface that is concave between the first end surface and the second end surface, wherein the second collar side surface is disposed opposite the first collar side surface; and
a first drive component that is selectively engageable with the collar, the first drive component including:
a first opening that receives the collar; and
a first set of teeth that are disposed in the first opening that are selectively engageable with the set of collar teeth, wherein each tooth of the first set of teeth includes:
a first end;
a second end disposed opposite the first end;
a first side surface that is convex from the first end to the second end; and
a second side surface that is convex from the first end to the second end, wherein the second side surface is disposed opposite the first side surface, and the first side surface engages the first collar side surface or the second side surface engages the second collar side surface when the first set of teeth meshes with the collar teeth; and
a first root radius at the first end and a second root radius at the second end, wherein the first root radius is greater than the second root radius.

2. The apparatus of claim 1 wherein the
first collar side surface is concave from the first end surface to the second end surface and
the second collar side surface is concave from the first end surface to the second end surface.

3. The apparatus of claim 1 wherein a collar tooth bisecting plane extends through the first end surface and the second end surface such that the axis is completely disposed in the collar tooth bisecting plane and the first collar side surface and the second collar side surface have mirror symmetry with respect to the collar tooth bisecting plane.

4. The apparatus of claim 3 further comprising a transverse collar tooth plane that is disposed perpendicular to the collar tooth bisecting plane and is equidistantly spaced from the first end surface and the second end surface, wherein the first collar side surface is disposed closer to the collar tooth bisecting plane at the transverse collar tooth plane than at the first end surface.

5. The apparatus of claim 4 wherein the second collar side surface is disposed closer to the collar tooth bisecting plane at the transverse collar tooth plane than at the second end surface.

6. The apparatus of claim 4 wherein the first collar side surface and the second collar side surface have mirror symmetry with respect to the transverse collar tooth plane.

7. The apparatus of claim 4 wherein a gap between adjacent collar teeth is bisected by a gap bisecting plane, wherein the collar has a concave cross section in the gap bisecting plane.

8. The apparatus of claim 7 wherein a root is disposed between adjacent collar teeth and a root midpoint radius where the gap bisecting plane intersects the transverse collar tooth plane is less than a root end radius where the gap bisecting plane intersects the first end surface.

9. The apparatus of claim 1 wherein the first side surface is disposed closer to the second side surface at the first end than at the second end.

10. The apparatus of claim 1 wherein each member of the first set of teeth has a tip surface that faces toward the axis and extends from the first end to the second end and extends from the first side surface to the second side surface, wherein the tip surface is disposed at a constant radial distance from the axis.

11. The apparatus of claim 1 wherein a tooth bisecting plane extends from the first end to the second end such that the axis is completely disposed in the tooth bisecting plane and the first side surface and the second side surface have mirror symmetry with respect to the tooth bisecting plane.

12. The apparatus of claim 1 further comprising a second drive component that is spaced apart from the first drive component and is configured to receive the collar, wherein the collar transmits torque between the shaft and the second drive component when the collar and the second drive component are meshingly engaged.

13. The apparatus of claim 12 wherein the collar does not transmit torque between the shaft and the first drive component when the collar engages the second drive component.

14. The apparatus of claim 12 wherein the second drive component includes:
a second opening that is disposed along the axis;
a second set of teeth that are disposed in the second opening that are selectively engageable with the set of collar teeth, wherein each tooth of the second set of teeth includes:
a third end;
a fourth end disposed opposite the third end;
a first lateral side surface that is convex between the third end and the fourth end; and
a second lateral side surface that is convex between the third end and the fourth end, wherein the second lateral side surface is disposed opposite the first lateral side surface, and the first lateral side surface engages the first collar side surface or the second lateral side surface engages the second collar side surface when the second set of teeth meshes with the set of collar teeth.

15. The apparatus of claim 14 wherein the first lateral side surface is disposed closer to the second lateral side surface at the third end than at the fourth end.

16. The apparatus of claim 14 wherein the collar has a transverse collar tooth plane that is disposed perpendicular to the axis and is equidistantly spaced from the first end surface and the second end surface, wherein the first drive component engages the collar between the transverse collar tooth plane and the first end surface.

17. The apparatus of claim 16 wherein the second drive component engages the collar between the transverse collar tooth plane and the second end surface.

18. The apparatus of claim 16 wherein the second end faces toward the fourth end.

19. The apparatus of claim 16 wherein the collar is spaced apart from the first drive component and the second drive component when the collar is positioned between the first drive component and the second drive component.

20. A torque transmission apparatus comprising:
a shaft that extends along an axis;
a collar that includes:
a collar hole that is disposed along the axis and receives the shaft; and a set of collar teeth that are disposed opposite the collar hole, wherein the collar teeth include:
  a first end surface that extends away from the axis;
  a second end surface that extends away from the axis and is disposed opposite the first end surface;
  a first collar side surface that is concave between the first end surface and the second end surface; and
  a second collar side surface that is concave between the first end surface and the second end surface, wherein the second collar side surface is disposed opposite the first collar side surface;
a first drive component that is selectively engageable with the collar, the first drive component including:
  a first opening that receives the collar; and
  a first set of teeth that are disposed in the first opening that are selectively engageable with the set of collar teeth, wherein each tooth of the first set of teeth includes:
    a first end;
    a second end disposed opposite the first end;
    a first side surface that is convex from the first end to the second end; and
    a second side surface that is convex from the first end to the second end, wherein the second side surface is disposed opposite the first side surface, the first side surface is disposed closer to the second side surface at the first end than at the second end, and the first side surface is engageable with the first collar side surface or the second side surface is engageable with the second collar side surface when the first set of teeth meshes with the collar teeth;
a second drive component that is selectively engageable with the collar, wherein the second drive component includes:
  a second opening that is disposed along the axis;
  a second set of teeth that are disposed in the second opening that are selectively engageable with the set of collar teeth, wherein each tooth of the second set of teeth includes:
    a third end;
    a fourth end that is disposed opposite the third end and that faces toward the second end;
    a first lateral side surface that is convex between the third end and the fourth end; and
    a second lateral side surface that is convex between the third end and the fourth end, wherein the second lateral side surface is disposed opposite the first lateral side surface, the first lateral side surface is disposed closer to the second lateral side surface at the third end than at the fourth end, and the first lateral side surface is engageable with the first collar side surface or the second lateral side surface is engageable with the second collar side surface when the second set of teeth meshes with the set of collar teeth.

* * * * *